(12) United States Patent
Jiang et al.

(10) Patent No.: US 11,263,814 B2
(45) Date of Patent: Mar. 1, 2022

(54) METHOD, APPARATUS, AND STORAGE MEDIUM FOR RENDERING VIRTUAL CHANNEL IN MULTI-WORLD VIRTUAL SCENE

(71) Applicant: TENCENT TECHNOLOGY (SHENZHEN) COMPANY LIMITED, Shenzhen (CN)

(72) Inventors: Huifu Jiang, Shenzhen (CN); Feng Xue, Shenzhen (CN); Nan Liu, Shenzhen (CN); Yifan Guo, Shenzhen (CN); Yaning Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/016,663

(22) Filed: Sep. 10, 2020

(65) Prior Publication Data

US 2020/0410757 A1 Dec. 31, 2020

Related U.S. Application Data

(63) Continuation of application No. PCT/CN2019/090470, filed on Jun. 10, 2019.

(30) Foreign Application Priority Data

Jul. 13, 2018 (CN) .......................... 201810771992.6

(51) Int. Cl.
*G06T 19/00* (2011.01)
*G06T 7/70* (2017.01)

(52) U.S. Cl.
CPC .............. *G06T 19/003* (2013.01); *G06T 7/70* (2017.01); *G06T 2207/30241* (2013.01); *G06T 2207/30244* (2013.01)

(58) Field of Classification Search
CPC ..................... G06T 19/003; G06T 7/70; G06T 2207/30241; G06T 2207/30244; G06T 19/20
See application file for complete search history.

(56) References Cited

U.S. PATENT DOCUMENTS

2005/0187023 A1* 8/2005 Miyamoto .......... A63F 13/5375
463/43
2012/0264512 A1* 10/2012 Abe .................... A63F 13/5252
463/31

(Continued)

FOREIGN PATENT DOCUMENTS

| CN | 107958480 A | 4/2018 | |
|---|---|---|---|
| CN | 108268138 A | 7/2018 | |
| WO | WO-2018124280 A1 * | 7/2018 | ............. G06T 19/00 |

OTHER PUBLICATIONS

International Search Report with English translation and Written Opinion regarding PCT/CN2019/090470 dated Sep. 17, 2019, 9 pages.

*Primary Examiner* — Maurice L. McDowell, Jr.
(74) *Attorney, Agent, or Firm* — Crowell & Moring LLP

(57) ABSTRACT

This application discloses methods and apparatus for rendering a virtual channel in a multi-world virtual scene. The method includes generating a virtual scene for displaying a virtual channel, a first world, and a second world, the virtual channel being used for a render camera to move between the first and second worlds; and receiving a control request for triggering the render camera to move in the virtual scene; and identifying a location of the render camera in response to the control request to obtain a movement trajectory of the render camera during movement in the virtual scene. The method further includes detecting a world state according to the movement trajectory; determining whether the world state is an intermediate state; in response to determining the (Continued)

world state is the intermediate state, generating a room for accommodating the render camera; and displaying in the virtual scene the room.

17 Claims, 23 Drawing Sheets

(56) References Cited

U.S. PATENT DOCUMENTS

| | | |
|---|---|---|
| 2017/0113138 A1* | 4/2017 | Makino ................ H04N 5/2224 |
| 2017/0358138 A1 | 12/2017 | Dack et al. |
| 2018/0096512 A1* | 4/2018 | Dahl ........................ G06T 13/40 |
| 2019/0279412 A1* | 9/2019 | Oh ........................ G06T 3/0012 |
| 2019/0366212 A1* | 12/2019 | Kusakihara ......... G06F 3/04815 |

\* cited by examiner

METHOD, APPARATUS, AND STORAGE MEDIUM FOR RENDERING VIRTUAL CHANNEL IN MULTI-WORLD VIRTUAL SCENE

RELATED APPLICATION

This application is a continuation application of PCT Patent Application No. PCT/CN2019/090470, filed on Jun. 10, 2019, which claims priority to Chinese Patent Application No. 201810771992.6, filed with the China National Intellectual Property Administration on Jul. 13, 2018, both of which are incorporated herein by reference in their entireties.

FIELD OF THE TECHNOLOGY

This application relates to the field of computer technologies, and in particular, to rendering of a virtual channel in a multi-world virtual scene.

BACKGROUND OF THE DISCLOSURE

With the development of computer technologies, an augmented reality (AR) technology is widely applied to various fields, such as the Internet of things and Internet gaming.

With the help of the AR technology, a user may experience crossing between two worlds. Specifically, as a client in user equipment runs, a virtual scene for displaying a virtual world and a real world is constructed accordingly, and a virtual channel, such as a cross gate, is provided between the virtual world and the real world. In this way, the user may see the other world in the virtual scene through the virtual channel. For example, it is assumed that a current world primarily seen by the user is the virtual world. Then, the real world is the other world.

SUMMARY

To resolve a technical problem in the foregoing scene, this application provides a method and an apparatus for rendering a virtual channel in a multi-world virtual scene.

The present disclosure describes a method for rendering a virtual channel in a multi-world virtual scene. The method includes generating, by a device, a virtual scene for displaying a virtual channel, a first world, and a second world, the virtual channel being used for a render camera to move between the first world and the second world. The device includes a memory storing instructions and a processor in communication with the memory. The method also includes receiving, by the device, a control request for triggering the render camera to move in the virtual scene; and identifying, by the device, a location of the render camera in response to the control request to obtain a movement trajectory of the render camera during movement in the virtual scene. The method further includes detecting, by the device, a world state according to the movement trajectory; determining, by the device, whether the world state is an intermediate state; in response to determining the world state is the intermediate state, generating, by the device, a room for accommodating the render camera; and displaying in the virtual scene, by the device, the room for accommodating the render camera.

The present disclosure describes an apparatus for rendering a virtual channel in a multi-world virtual scene. The apparatus includes a memory storing instructions; and a processor in communication with the memory. When the processor executes the instructions, the processor is configured to cause the apparatus to generate a virtual scene for displaying a virtual channel, a first world, and a second world, the virtual channel being used for a render camera to move between the first world and the second world, receive a control request for triggering the render camera to move in the virtual scene, identify a location of the render camera in response to the control request to obtain a movement trajectory of the render camera during movement in the virtual scene, detect a world state according to the movement trajectory, determine whether the world state is an intermediate state, in response to determining the world state is the intermediate state, generate a room for accommodating the render camera, and display in the virtual scene the room for accommodating the render camera.

The present disclosure describes a non-transitory computer readable storage medium storing computer readable instructions. The computer readable instructions, when executed by a processor, are configured to cause the processor to perform generating a virtual scene for displaying a virtual channel, a first world, and a second world, the virtual channel being used for a render camera to move between the first world and the second world; receiving a control request for triggering the render camera to move in the virtual scene; identifying a location of the render camera in response to the control request to obtain a movement trajectory of the render camera during movement in the virtual scene; detecting a world state according to the movement trajectory; determining whether the world state is an intermediate state; in response to determining the world state is the intermediate state, generating a room for accommodating the render camera; and displaying in the virtual scene the room for accommodating the render camera.

According to another aspect, an apparatus for rendering a virtual channel in a multi-world virtual scene is provided, including: a scene generating module, configured to generate a virtual scene for displaying a virtual channel, a first world, and a second world, the virtual channel being used for a render camera to move between the first world and the second world; a request receiving module, configured to receive a control request for triggering the render camera to move in the virtual scene; a location identifying module, configured to identify a location of the render camera in response to the control request to obtain a movement trajectory of the render camera during movement in the virtual scene; and a room generating module, configured to detect a world state according to the movement trajectory, and generate a room capable of accommodating the render camera for the virtual channel in a case that it is detected that the world state is an intermediate cross state.

In an exemplary embodiment, the request receiving module includes: a movement state detecting unit, configured to detect a movement state of a mobile terminal; and a first request generating unit, configured to generate the control request according to the detected movement state of the mobile terminal, to trigger the render camera to move in the virtual scene according to the movement state of the mobile terminal.

In an exemplary embodiment, the request receiving module includes: a second request generating unit, configured to generate the control request according to a moving operation triggered in the virtual scene, to trigger the render camera to move in the virtual scene according to the moving operation.

In an exemplary embodiment, the room generating module includes: a location determining unit, configured to determine the location of the render camera and a distance between the location and the virtual channel according to the movement trajectory; and a first detecting unit, configured to detect that the world state is a first world state in a case that the distance exceeds a specified range and the location is in the first world; or a second detecting unit, configured to detect that the world state is a second world state in a case that the distance exceeds a specified range and the location is in the second world; or a third detecting unit, configured to detect that the world state is the intermediate cross state in a case that the distance does not exceed a specified range.

In an exemplary embodiment, the intermediate cross state includes a first intermediate state and a second intermediate state, and the third detecting unit includes: a first intermediate state detecting unit, configured to detect that the world state is switched from the first intermediate state to the second intermediate state in a case that the movement trajectory indicates that the render camera moves from the first world to the second world through the virtual channel; or a second intermediate state detecting unit, configured to detect that the world state is switched from the second intermediate state to the first intermediate state in a case that the movement trajectory indicates that the render camera moves from the second world to the first world through the virtual channel.

In an exemplary embodiment, the room generating module includes: a second data obtaining unit, configured to obtain second room model data in a case that it is detected that the world state is the first intermediate state of the intermediate cross state; and a second rendering unit, configured to generate, through rendering according to the second room model data, a room with a wall convex in a movement direction indicated by the movement trajectory, a convex area enclosed by the wall and the virtual channel being used for accommodating the render camera.

In an exemplary embodiment, the room generating module includes: a third data obtaining unit, configured to obtain third room model data in a case that it is detected that the world state is the second intermediate state of the intermediate cross state; and a third rendering unit, configured to generate, through rendering according to the third room model data, an outer room and an inner room that are nested, a wall of the inner room being concave in a movement direction indicated by the movement trajectory, and a concave area enclosed by the wall of the inner room and the virtual channel being used for accommodating the render camera.

In an exemplary embodiment, the apparatus further includes a state maintaining unit, configured to still display the virtual channel in the virtual scene in a case that it is detected that the world state is the first world state.

In an exemplary embodiment, the apparatus further includes: a fourth data obtaining unit, configured to obtain fourth room model data in a case that it is detected that the world state is the second world state; and a fourth rendering unit, configured to generate, through rendering according to the obtained fourth room model data, a room including a first wall part and a second wall part; the first wall part and the second wall part being located on two sides of a plane on which the virtual channel is located, and a room area enclosed by the second wall part and the plane on which the virtual channel is located being used for accommodating the render camera.

In an exemplary embodiment, the apparatus further includes: a data re-obtaining unit, configured to re-obtain fourth room model data in a case that the movement trajectory indicates that the render camera moves to the room area; and a re-rendering unit, configured to re-render a symmetrical room for the virtual channel according to the re-obtained fourth room model data.

In an exemplary embodiment, the scene generating module includes: a first data obtaining unit, configured to obtain first room model data to generate the virtual channel; an image data obtaining unit, configured to obtain first image data and second image data to generate the first world and the second world respectively; a merged rendering unit, configured to perform merged image rendering on the virtual channel, the first world, and the second world to obtain an image rendering result; and a displaying unit, configured to display, in the virtual scene, the virtual channel, the first world, and the second world according to the image rendering result.

In the foregoing technical solutions, in a virtual scene for displaying a virtual channel, a first world, and a second world, a control request for triggering a render camera to move is received; a location of the render camera is identified in response to the control request to obtain a movement trajectory of the render camera during movement in the virtual scene; a world state is detected according to the movement trajectory; and a room capable of accommodating the render camera is generated for the virtual channel in a case that it is detected that the world state is an intermediate cross state. In this way, when a user crosses between the two worlds, even though the virtual channel has an extremely small thickness, the user always sees one of the worlds in the virtual scene through the room because the render camera is accommodated in the room, thereby avoiding a world jump seen by the user in the related art.

It is to be understood that the foregoing general description and the following detailed description are merely illustrative and explanatory and do not limit this application.

BRIEF DESCRIPTION OF THE DRAWINGS

The accompanying drawings herein are incorporated into the specification and constitute a part of the specification, illustrate the embodiments of this application, and are used for explaining the principles of this application together with the specification.

Figure 1:
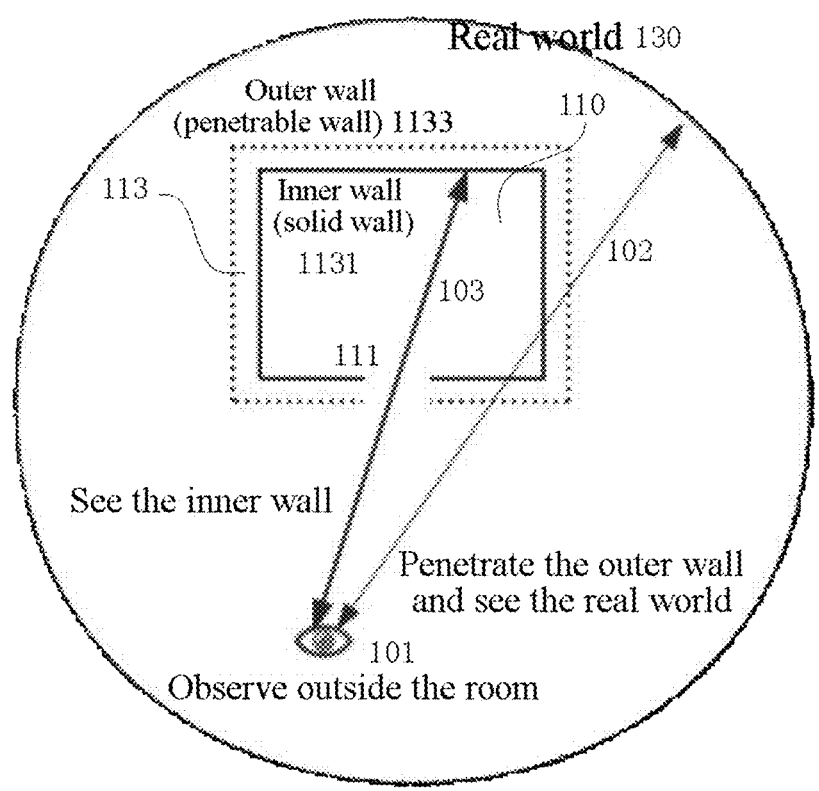
FIG. 1 is a schematic top view of a virtual scene constructed based on a room model in the related art.

Explicit embodiments in this application are shown by using the foregoing accompanying drawings, more detailed descriptions are provided below. The accompanying drawings and literal descriptions are not intended to limit the scope of the idea of this application in any manner, but explain the concept of this application by referring to specific embodiments for a person skilled in the art.

DESCRIPTION OF EMBODIMENTS

Exemplary embodiments are described in detail herein, and examples of the exemplary embodiments are shown in the accompanying drawings. When the following descriptions relate to the accompanying drawings, unless otherwise indicated, same numbers in different accompanying drawings represent same or similar elements. The following implementations described in the following exemplary embodiments do not represent all implementations that are consistent with this application. On the contrary, the implementations are merely examples of apparatuses and methods that are described in detail in the appended claims and that are consistent with some aspects of this application.

The terms such as "first" and "second" in the specification, claims, and accompanying drawings of this application are intended to distinguish between similar objects rather than describe a particular sequence or a chronological order. It is to be understood that the data termed in such a way are interchangeable in proper circumstances so that the embodiments of this application described herein can be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

As described above, for two worlds with infinite space in a virtual scene, an image rendering method is mainly implemented based on scene superposition. However, as limited by hardware configured on user equipment, the scene superposition solution is prone to poor image rendering performance, leading to relatively low picture fluency in the user equipment.

Therefore, the present disclosure describes a method of replacing the scene superposition solution with a room model solution to render a virtual channel in a multi-world virtual scene, thereby improving image rendering performance.

First, the following describes the room model solution.

FIG. 1 is a schematic top view of a virtual scene constructed based on a room model. As shown in FIG. 1, the virtual scene includes two worlds. One of the worlds is a real world 130 with infinite space, and the other world is a room 110 with finite space.

A virtual scene is essentially a virtual environment in which a three-dimensional model is presented to a user. Therefore, any world that exists in the virtual scene may be considered as a three-dimensional model. For example, the room 110 is considered as a room model.

In this virtual scene, the room 110 is located within the real world 130 as one world in the virtual scene. The room 110 is enclosed by a virtual channel 111 and a wall 113. In one implementation, the virtual channel 111 may be a gate or a virtual gate.

The wall 113 has two layers, including an inner wall layer 1131 and an outer wall layer 1133. The inner wall layer 1131 is a solid wall. In other words, a user's vision penetrates the inner wall layer 1131 via light and actually still sees the inner wall layer 1131. The outer wall layer 1133 is constructed by a transparent material. The user's vision penetrates the outer wall layer 1133 via light and actually sees the real world 130 behind the outer wall layer 1133 in the virtual scene. Therefore, the inner wall layer 1131 may also be understood as a solid wall, and the outer wall layer 1133 may be understood as a penetrable wall.

During image rendering, the user's vision is implemented based on a render camera that performs the image rendering. In other words, the render camera serves as a starting point of the user's vision in the virtual scene. Specifically, as the render camera moves, the virtual scene also moves relative to the user's vision, thereby showing the user an animation effect. For example, if the render camera is pushed forward, the user's vision moves forward with the render camera. In this case, the virtual scene seems to be increasingly close to the user, thereby forming an animation effect that the virtual scene approaches the user.

In addition, the render camera herein for image rendering is different from a camera configured for user equipment. The render camera is not used for image acquisition, but enables a screen configured for the user equipment to display a picture generated through image rendering.

Further, as shown in FIG. 1, it is assumed that a render camera 101 is located outside the room 110. To be specific, the user's vision observes outside the room 110. As shown by a direction of light 103, the user's vision sees the inner wall layer 1131 through the virtual channel 111. As shown by a direction of light 102, the user's vision sees the real world 130 through the outer wall layer 1133.

Figure 2:
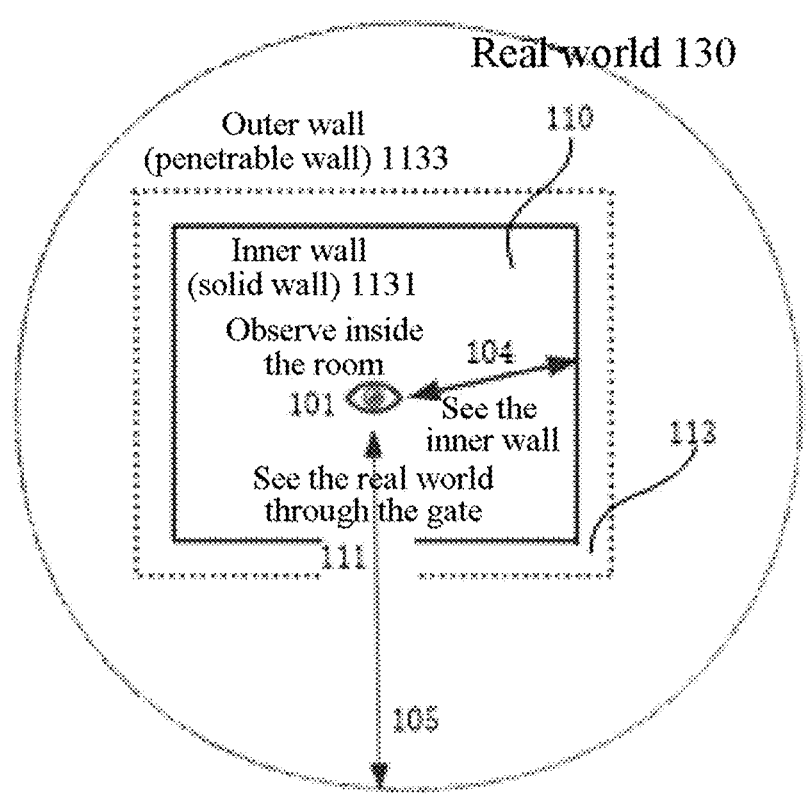
FIG. 2 is another schematic top view of a virtual scene constructed based on a room model in the related art.

As shown in FIG. 2, it is assumed that the render camera 101 is located inside the room 110. To be specific, the user's vision observes inside the room 110. As shown by a direction of light 104, the user's vision sees the inner wall layer 1131. As shown by a direction of light 105, the user's vision sees the real world 130 through the virtual channel 111.

It can be learned from the above that based on the virtual channel provided for the room model, the user feels like crossing between the two worlds (the room and the real world).

Understandably, the room model solution initially is not intended for two worlds with finite space in a virtual scene. In other words, the room in the room model solution represents a world with finite space. Therefore, the room model solution cannot directly replace the scene superposition solution to be applied to rendering a virtual channel in a multi-world virtual scene.

Therefore, to improve image rendering performance, the first technical problem to be resolved in this application is how to use a room model to display two worlds with infinite space in a virtual scene.

Further, it is assumed that two worlds with infinite space are displayed in a virtual scene by using the room model. Then, because a room is usually enclosed by a virtual channel and a wall as described above, when a virtual channel in a multi-world virtual scene is rendered, it is always expected that a user's vision can see the other world in the virtual scene only through the virtual channel, but the other world in the virtual scene cannot be seen through the wall.

However, when close to the wall provided for the room model, if the user's vision can see the other world in the virtual scene, wall penetration occurs.

Figure 3:
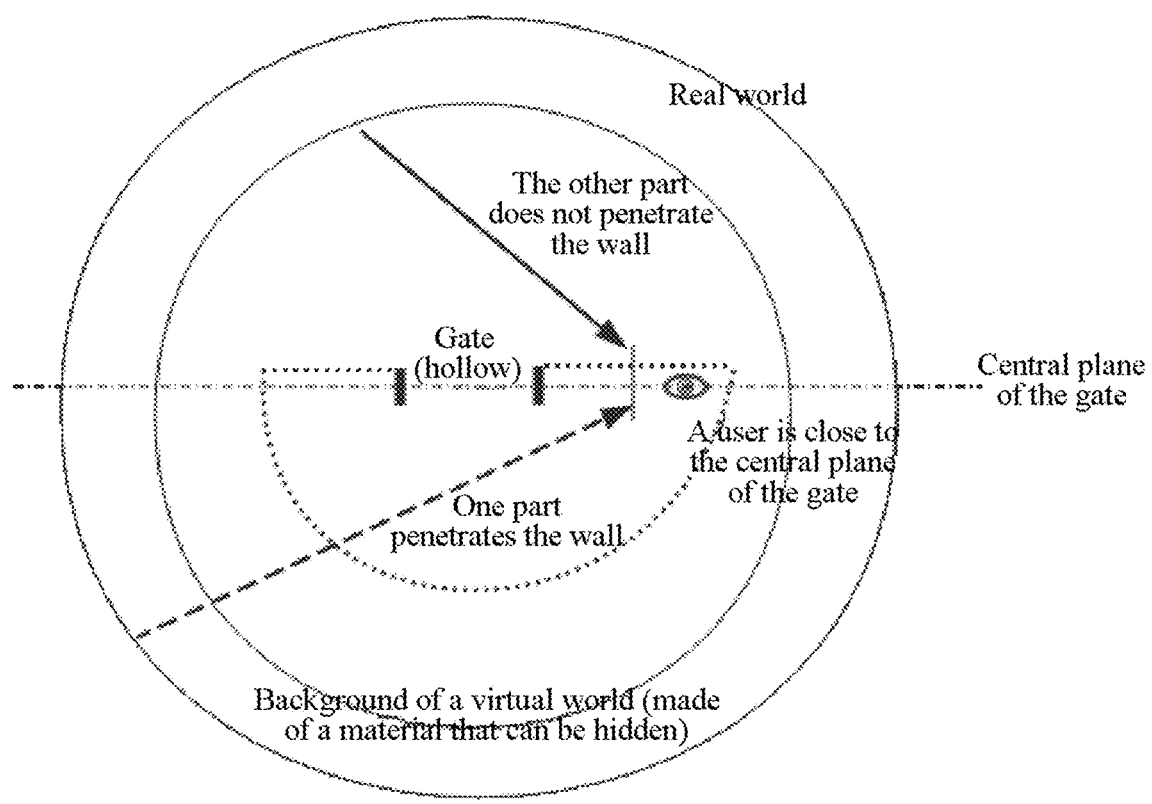
FIG. 3 is a schematic diagram of a principle of wall penetration in this application.

As shown in FIG. 3, when the user's vision is infinitely close to the wall provided for the room model, a perspective intermediate state may occur if the user's vision observes along a plane on which the virtual channel is located toward a location of the virtual channel. Specifically, one part of the user's vision penetrates the wall and sees the other world in the virtual scene, while the other part does not penetrate the wall and still sees a current world in the virtual scene. In this case, wall penetration occurs.

In addition, when the render camera moves between the current world and the other world through the virtual channel, or in other words, when the user crosses between the two worlds, the perspective intermediate state may also occur if the user's vision observes toward the virtual channel. In this case, wall penetration also occurs.

Therefore, to avoid wall penetration, the wall and the virtual channel with certain thicknesses are provided for the virtual scene in this room model solution. However, when the thickness of the wall/virtual channel is relatively large, the user may see a world jump during crossing between the two worlds. For example, a black screen occurs on user equipment, or a picture displayed on the user equipment switches between the current world and the other world. This is not conducive to improving the user's entertainment experience.

To this end, when the room model is used to display two worlds with infinite space in a virtual scene, this application needs to resolve a world jump seen by the user during crossing between the two worlds due to a large thickness of a virtual channel while avoiding wall penetration.

Therefore, the present disclosure describes embodiments of methods for rendering a virtual channel in a multi-world virtual scene, which can replace the scene superposition solution and solves at least some issues/problems associated with previous solutions, thereby effectively improving image rendering performance, improving picture fluency in user equipment, and ensuring an extremely small thickness of a virtual channel while avoiding wall penetration. Accordingly, the virtual channel rendering method is adapted to a virtual channel rendering apparatus, which is deployed on user equipment. For example, the user equipment may be a smartphone, a tablet computer, a laptop computer, a handheld computer, or any other electronic device that can construct a virtual scene, which is not limited herein.

Figure 4:
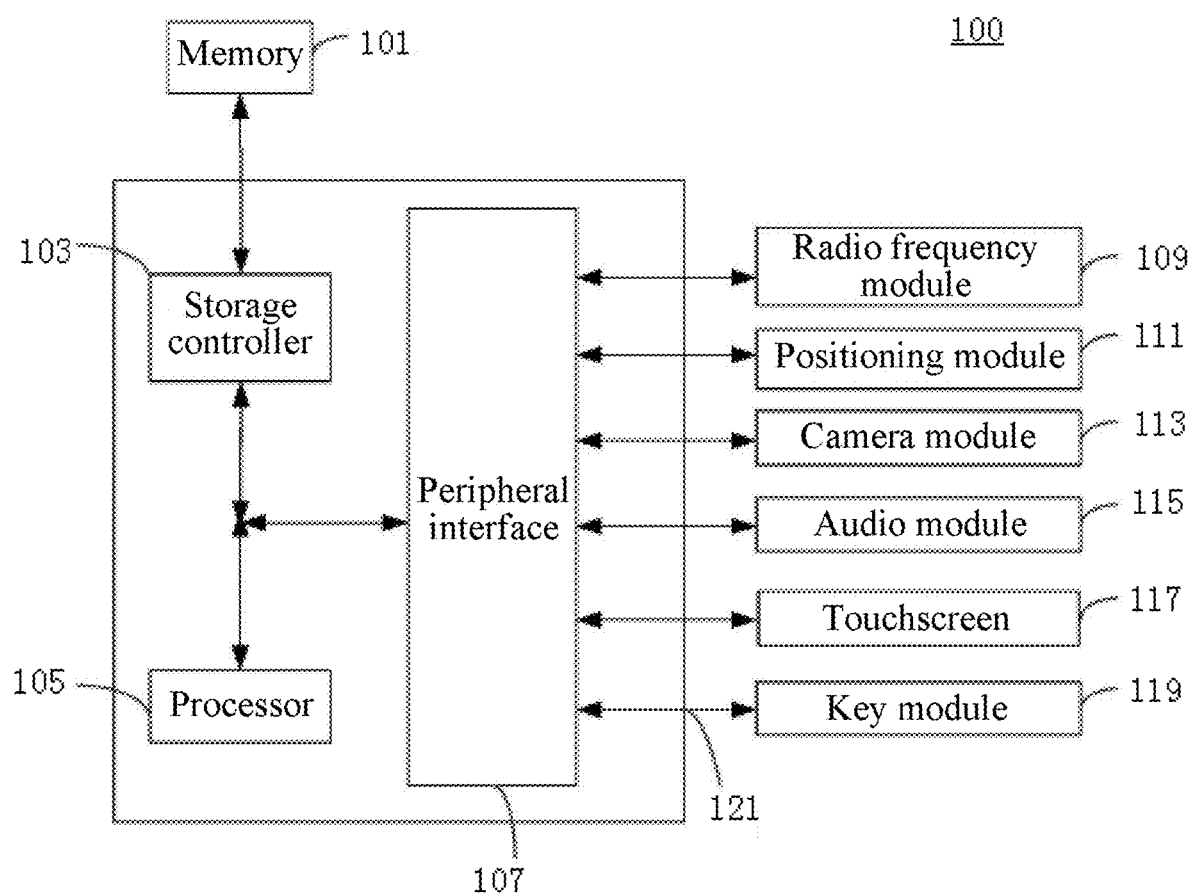
FIG. 4 is a block diagram of a hardware structure of a terminal according to an exemplary embodiment.

FIG. 4 is a block diagram of user equipment according to an exemplary embodiment.

The user equipment is only an example adapted to this application and cannot be considered to provide any limitation on the application scope of this application. In addition, the user equipment cannot be interpreted as needing to rely on or having to include one or more components of exemplary user equipment 100 shown in FIG. 4.

As shown in FIG. 4, the user equipment 100 includes a memory 101, a storage controller 103, one or more (only one is shown in FIG. 4) processors 105, a peripheral interface 107, a radio frequency module 109, a positioning module 111, a camera module 113, an audio module 115, a touchscreen 117, and a key module 119. These components communicate with each other by using one or more communications buses/signal lines 121.

The memory 101 may be configured to store a computer program and a module, such as a computer readable instruction and a module corresponding to the method and apparatus for rendering a virtual channel in a multi-world virtual scene in exemplary embodiments of this application. The processor 105 performs various functions and data processing by running the computer readable instruction stored in the memory 101, thereby completing the method for rendering a virtual channel in a multi-world virtual scene.

As a carrier of resource storage, the memory 101 may be a random access memory (RAM), for example, a high-speed RAM, a non-volatile memory, such as one or more magnetic storage apparatuses, a flash memory, or another solid-state memory. Storage may be temporary or permanent.

The peripheral interface 107 may include at least one wired or wireless network interface, at least one serial-parallel conversion interface, at least one input/output interface, at least one USB interface, and the like, which is configured to couple various external input/output apparatuses to the memory 101 and the processor 105, to communicate with the external input/output apparatuses.

The radio frequency module 109 is configured to transmit and receive electromagnetic waves, to convert between electromagnetic waves and electrical signals, thereby communicating with another device by using a communication network. The communication network may be a cellular telephone network, a wireless local area network, or a metropolitan area network. The communication network may use various communication standards, protocols, and technologies.

The positioning module 111 is configured to obtain a current geographical location of the user equipment 100. Examples of the positioning module 111 include, but are not limited to, the global satellite positioning system (GPS) and positioning technologies based on a wireless local area network or a mobile communication networks.

The camera module 113 belongs to a camera and is configured to shoot pictures or videos. The shot pictures or videos may be stored in the memory 101, and may further be transmitted to a host computer by using the radio frequency module 109.

The audio module 115 provides an audio interface to a user, and may include one or more microphone interfaces, one or more speaker interfaces, and one or more headset interfaces. The audio module 115 exchanges audio data with another device through the audio interface. The audio data may be stored in the memory 101, and may further be transmitted by using the radio frequency module 109.

The touchscreen 117 provides an input/output interface between the user equipment 100 and the user. Specifically, on the touchscreen 117, the user may perform an input operation, for example, a gesture operation such as tapping/clicking, touching, or sliding, so that the user equipment 100 responds to the input operation. The user equipment 100 displays an output in a form of any one or a combination of text, picture, or video to the user on the touchscreen 117.

The key module 119 includes at least one key, and is configured to provide the user with an interface for inputting to the user equipment 100. The user may enable the user equipment 100 to perform different functions by pressing different keys. For example, a volume adjustment key may enable the user to adjust a volume of sound played by the user equipment 100.

It can be understood that the structure shown in FIG. 4 is merely exemplary, and the user equipment 100 may alternatively include more or fewer components than those shown in FIG. 4, or have components different from those shown in FIG. 4. The components shown in FIG. 4 may be implemented by hardware, software, or a combination thereof.

Figure 5:
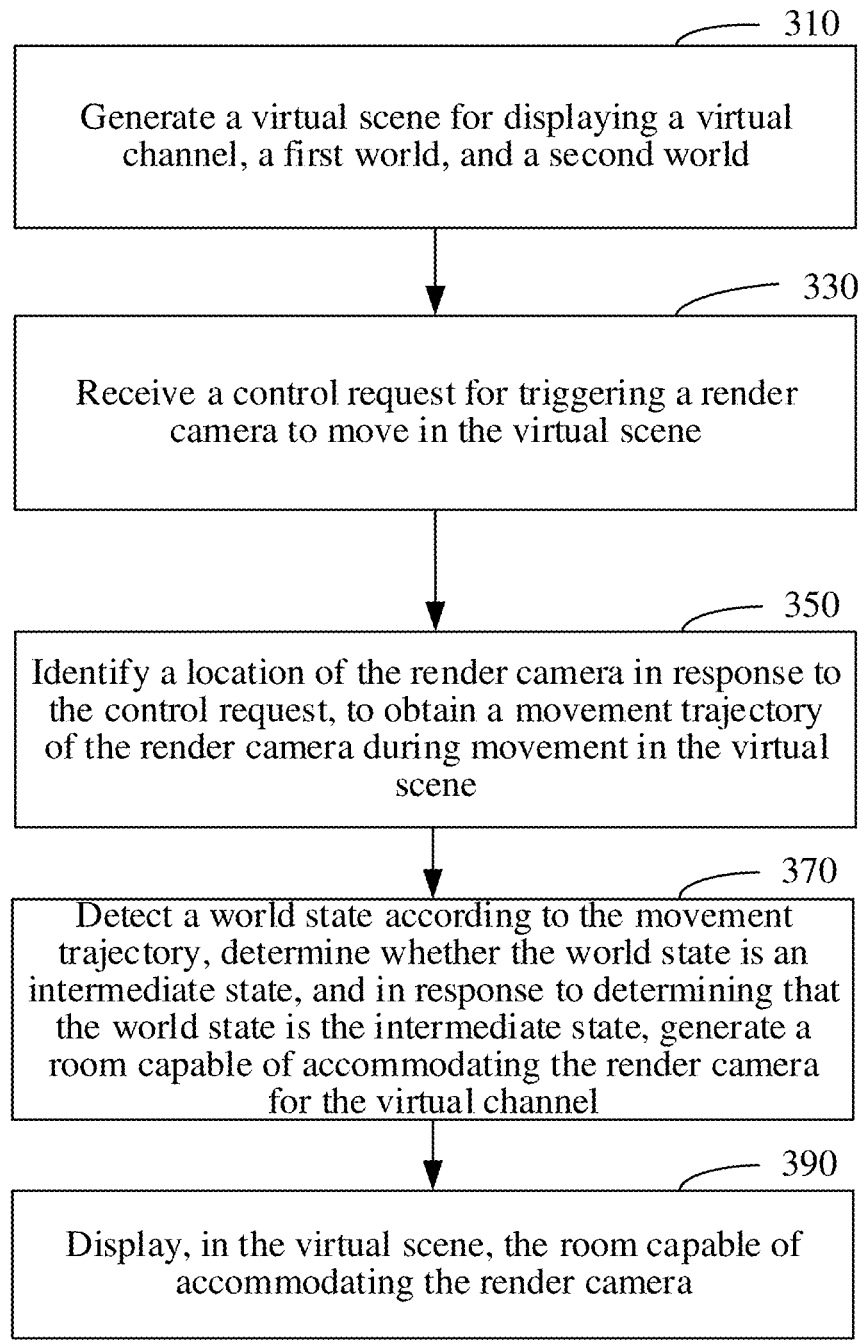
FIG. 5 is a flowchart of a method for rendering a virtual channel in a multi-world virtual scene according to an exemplary embodiment.

Referring to FIG. 5, in an exemplary embodiment, a method for rendering a virtual channel in a multi-world virtual scene applies to user equipment. A structure of the user equipment may be shown in FIG. 4.

The method for rendering a virtual channel in a multi-world virtual scene may be executed by the user equipment, or it may be understood that the virtual channel rendering method is executed by a client running on the user equipment. For ease of description, in the following method embodiment, the virtual channel rendering method is described as being executed by the client.

The method for rendering a virtual channel in a multi-world virtual scene may include the following steps:

Step 310: Generate a virtual scene for displaying a virtual channel, a first world, and a second world.

As described above, the virtual scene is constructed accordingly as the client in the user equipment runs. The client may be in a form of an application or a web page. Accordingly, the virtual scene may be displayed to a user by using an application window or a web page, which is not limited herein.

After the virtual scene is constructed, initial forms of the virtual channel, the first world, and the second world are displayed. The virtual channel may be used for a render camera to move between the first world and the second world. The user's vision may see a world in the virtual scene through the virtual channel. For example, as shown in FIG. 6, in the constructed virtual scene, when the render camera is located in the first world, or in other words, when the user's vision 101 observes inside the first world, the user's vision sees the second world in the virtual scene through the virtual channel.

In an embodiment, in the constructed virtual scene, the first world is a virtual world, and the second world is also a virtual world, for example, in a gaming scenario in which a game player manipulated by the user may cross between different virtual worlds. In another embodiment, in the constructed virtual scene, the first world is a virtual world, and the second world is a real world, for example, in an instant messaging scenario in which the user may cross between the virtual world and the real world by using an instant messaging client.

Figure 6:
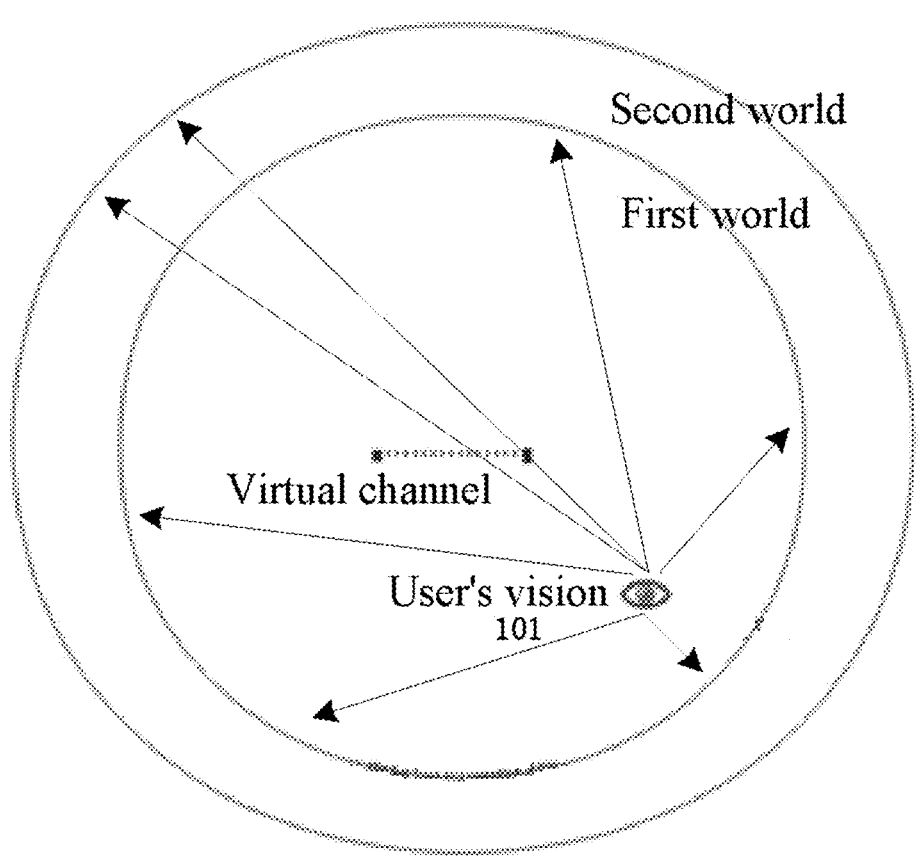
FIG. 6 is a schematic top view of a virtual scene constructed based on a room model according to an exemplary embodiment.

The virtual channel in FIG. 6 is made of a transparent material with an extremely small thickness.

Figure 7:
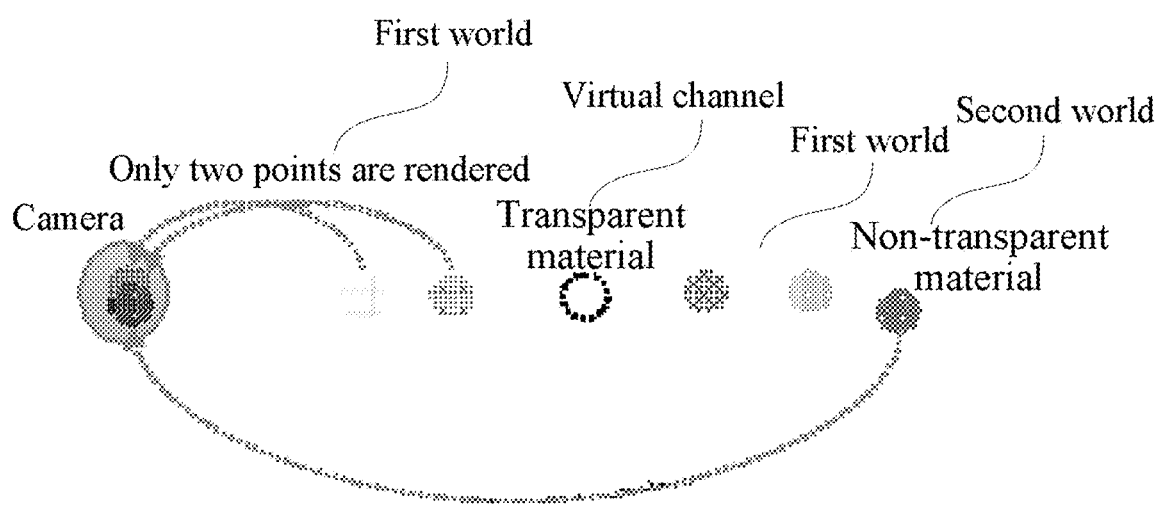
FIG. 7 is a schematic diagram of a principle of perspective rendering in this application.

In addition, based on a principle of image rendering of the transparent material, as shown in FIG. 7, depending on a location of the render camera in the virtual scene, an image corresponding to the first world between the virtual channel and the render camera is rendered while an image corresponding to the first world between the virtual channel and the second world is not rendered, and an image corresponding to the second world made of a non-transparent material is always rendered. Therefore, the render camera serves as a starting point of the user's vision in the virtual scene, and the user's vision actually sees the second world instead of the first world through the virtual channel. Certainly, the first world is made of a material that can be hidden, to ensure that the first world can be hidden through the virtual channel.

Further, since the virtual scene is constructed with the render camera as a center point, the user's vision sees a panorama in the virtual scene accordingly when the render camera rotates by 360 degrees with itself as a center point. For example, as shown in FIG. 6, the user's vision may see different pictures corresponding to the first world from a plurality of angles, and may also see different pictures corresponding to the second world from different angles through the virtual channel.

Understandably, for the virtual channel whose initials form is displayed in the constructed virtual scene, as shown in FIG. 6, when the render camera 101 is located in the first world, a world directly seen by the user's vision is the first world and a world seen by the user's vision through the virtual channel is the second world. Similarly, when the render camera 101 is located in the second world, a world directly seen by the user's vision is the second world and a world seen by the user's vision through the virtual channel is the first world. Therefore, the user feels like crossing between the first world and the second world.

Figure 8:
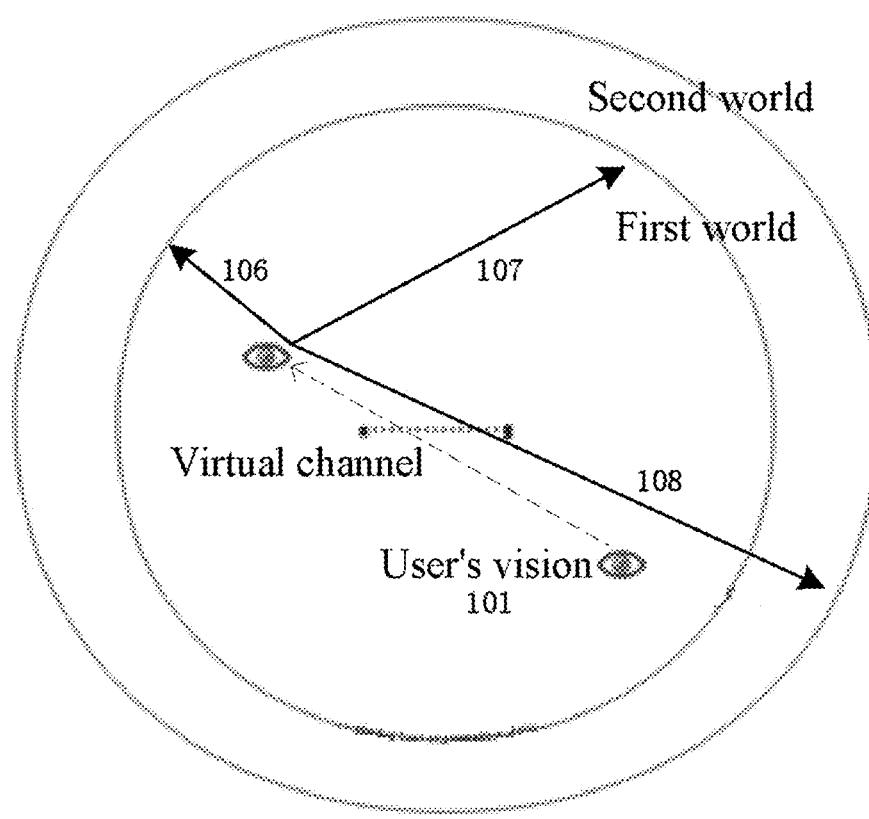
FIG. 8 is a schematic top view of a virtual scene after a render camera moves according to an exemplary embodiment.

However, as shown in FIG. 8, assuming that the virtual channel is still in the initial form after the render camera 101 moves from the first world to the second world through the virtual channel, an error occurs in a world seen by the user's vision. For example, as shown by directions of light 106 and 107, the user's vision still sees the first world. As shown by a direction of light 108, the user's vision still sees the second world through the virtual channel.

The foregoing error is caused by a fact that the room model solution is inapplicable to two worlds with infinite space, that is, the room model solution cannot directly replace the scene superposition solution.

Therefore, in this application, rooms with different structures are generated for the virtual channel according to a movement trajectory of the render camera during movement in the virtual scene, to replace the scene superposition solution with the room model solution in rendering a virtual channel in a multi-world virtual scene.

It can be learned from the above that whether the render camera moves in the virtual scene needs to be determined first, that is, step 330 is performed.

Step 330: Receive a control request for triggering the render camera to move in the virtual scene.

In the virtual scene, a mobility control entry is added for the user. When the user wants to trigger the render camera to move in the constructed virtual scene, related manipulation behavior may be implemented at the mobility control entry, so that the user equipment receives the control request and triggers the render camera to move in the constructed virtual scene according to the control request. It is to be understood that the render camera in the constructed virtual scene moves according to the related manipulation behavior implemented by the user.

The related manipulation behavior implemented by the user at the mobility control entry varies with the user equipment and an input component configured for it.

In a specific implementation of an embodiment, the user may trigger the render camera to move in the constructed virtual scene by controlling a mobile terminal (for example, portable user equipment such as a smartphone or a tablet computer) to move. The related manipulation behavior implemented by the user is controlling the mobile terminal to move.

Figure 9:
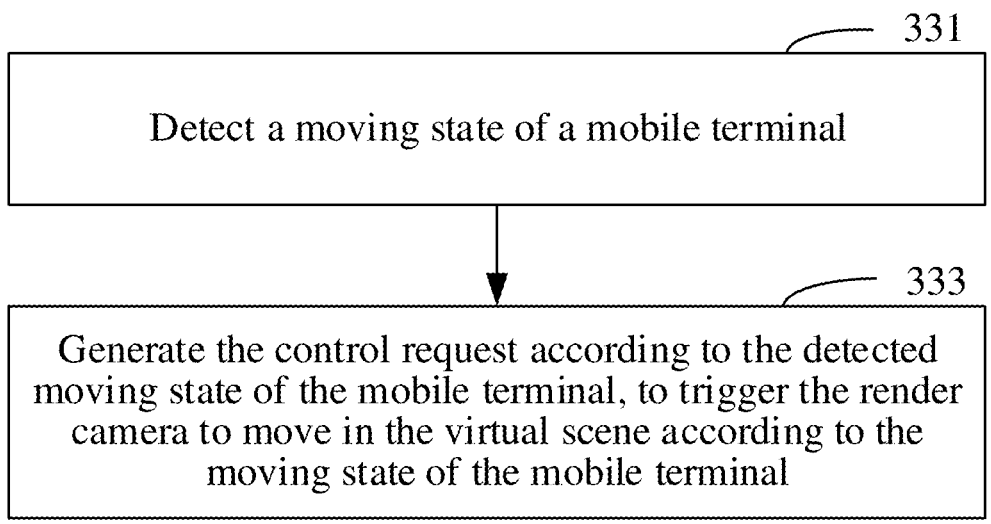
FIG. 9 is a flowchart of step 330 in the embodiment corresponding to FIG. 4 according to an embodiment.

Accordingly, as shown in FIG. 9, step 330 may include the following steps:

Step 331: Detect a moving state of a mobile terminal. In one implementation, the moving state of the mobile terminal may indicate a movement state of the mobile terminal.

Step 333: Generate the control request according to the detected moving state of the mobile terminal, to trigger the render camera to move in the virtual scene according to the moving state of the mobile terminal.

For example, as shown in FIG. 6, the user controls the mobile terminal to move to the left front. In this case, the mobile terminal, as the user equipment, controls the render camera to move toward the virtual channel in the virtual scene according to the detected moving state that indicates that the mobile terminal moves to the left front.

In a specific implementation of another embodiment, the user may trigger a moving operation by using the input component (such as a mouse, a keyboard, or a touchscreen) configured for the user equipment, to trigger the render camera to move in the constructed virtual scene. For example, a drag/click operation performed by using the mouse, a shortcut key operation performed by using the keyboard, a slide gesture operation performed by using the touchscreen, and the like are all considered as moving operations, that is, the related manipulation behavior implemented by the user.

Accordingly, step 330 may include the following step:

generating the control request according to a moving operation triggered in the virtual scene, to trigger the render camera to move in the virtual scene according to the moving operation.

In short, in an embodiment, the control request is generated in response to the moving state of the user equipment. In another embodiment, the control request is generated in response to the moving operation triggered by using the input component configured for the user equipment.

Then, when receiving the control request, the user equipment may determine that the render camera moves in the virtual scene.

Step 350: Identify a location of the render camera in response to the control request, to obtain a movement trajectory of the render camera during movement in the virtual scene.

As described above, if the render camera is always in the first world, for example, the render camera moves within the first world, no error will occur in the world seen by the user, and the virtual channel may always maintain the initial form present when the virtual scene is constructed. If the render camera moves from the first world to the second world through the virtual channel, an error will occur in the world seen by the user, as shown in FIG. 8. In this case, rooms with different structures need to be generated for the virtual channel.

Therefore, after the user equipment determines that the render camera moves in the virtual scene, the movement trajectory of the render camera during movement in the virtual scene, that is, a change in the location of the render camera during movement in the virtual scene, needs to be further determined, to determine whether the structures of the rooms generated for the virtual channel need to be changed according to the movement trajectory of the render camera during movement in the virtual scene.

In a specific implementation of an embodiment, the location of the render camera is identified by a render engine built in the client. As the client runs, the render engine is invoked to identify the location of the render camera, so that the movement trajectory of the render camera during movement in the virtual scene may be obtained.

Step 370: Detect a world state according to the movement trajectory, determine whether the world state is an intermediate state, and in response to determining that the world state is the intermediate state, generate a room capable of accommodating the render camera for the virtual channel.

Figure 10:
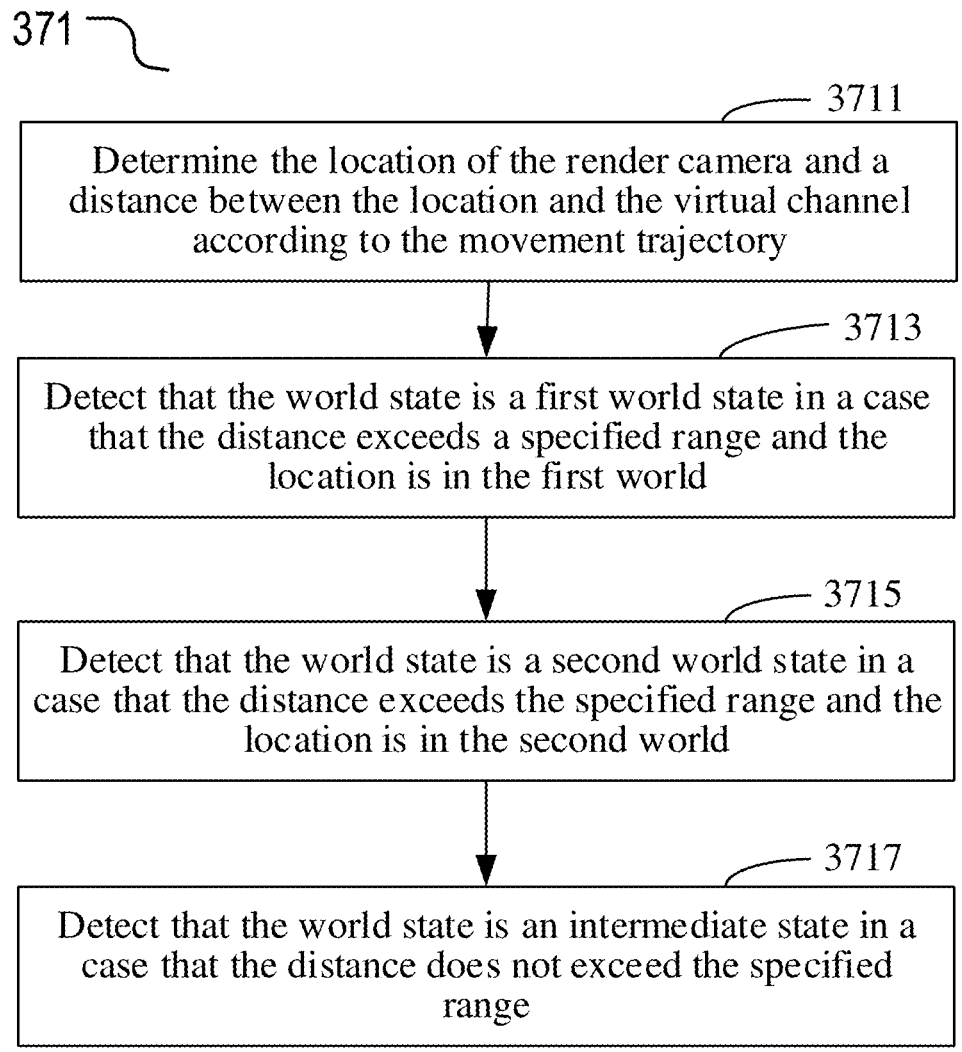
FIG. 10 is a flowchart of step 371 in the embodiment corresponding to FIG. 4 according to an embodiment.
Figure 13:
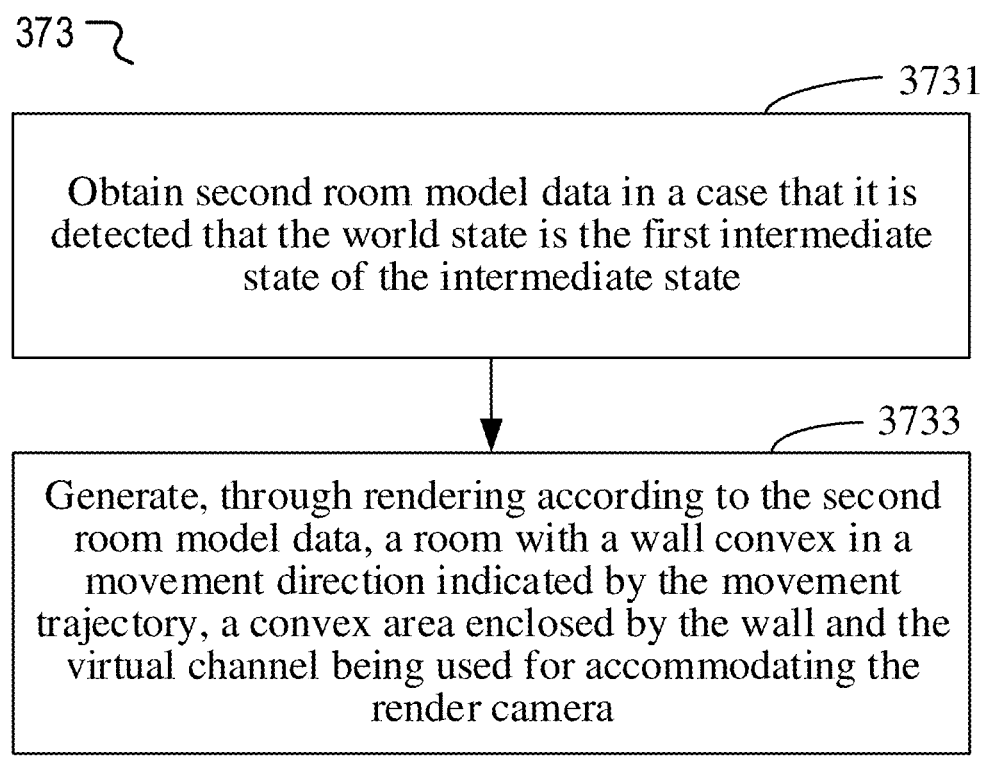
FIG. 13 is a flowchart of step 373 in the embodiment corresponding to FIG. 4 according to an embodiment.

For ease of description referring to FIGS. 5, 10, and 13, step 370 is further divided into the following two steps:

Step 371: Detect the world state according to the movement trajectory.

Step 373: Generate the room capable of accommodating the render camera for the virtual channel in a case that it is detected that the world state is the intermediate state.

First, the world state includes a first world state, a second world state, and the intermediate state.

The first world state means that the location of the render camera is away from the virtual channel and in the first world.

The second world state means that the location of the render camera is away from the virtual channel and in the second world.

The intermediate state means that the location of the render camera is close to the virtual channel.

The following describes a process of detecting the world state.

In a specific implementation of an embodiment, as shown in FIG. 10, step 371 may include the following steps:

Step 3711: Determine the location of the render camera and a distance between the location and the virtual channel according to the movement trajectory.

As described above, the movement trajectory reflects the change in the location of the render camera during movement in the virtual scene. Therefore, the location of the render camera during movement in the virtual scene may be obtained according to the movement trajectory.

After the location of the render camera during movement in the virtual scene is obtained, whether the location of the render camera is close to the virtual channel needs to be determined accordingly, to facilitate subsequent detection of the world state.

Specifically, the distance between the location of the render camera and the virtual channel is calculated.

If the distance does not exceed a specified range, the render camera is considered to be close to the virtual channel.

If the distance exceeds the specified range, the render camera is considered to be away from the virtual channel.

The specified range refers to an area near the virtual channel in the virtual scene, which may be adjusted flexibly according to actual requirements, and is not limited herein.

Step 3713: Detect that the world state is the first world state in a case that the distance exceeds the specified range and the location is in the first world.

Step 3715: Detect that the world state is the second world state in a case that the distance exceeds the specified range and the location is in the second world.

Step 3717: Detect that the world state is the intermediate state in a case that the distance does not exceed the specified range.

Further, after the world state is detected, whether the rooms with different structures need to be generated for the virtual channel may be determined.

For example, if the world state is the first world state, indicating that the render camera always moves in the first world, no error will occur in the world seen by the user's vision, and the virtual channel may always maintain the initial form present when the virtual scene is constructed.

Alternatively, if the world state is the second world state or the intermediate state, indicating that the render camera moves from the first world to the second world through the virtual channel and eventually stays in the second world, or indicating that the render camera tends to move between the first world and the second world through the virtual channel, an error may occur in the world seen by the user's vision. In this case, the rooms with different structures are generated for the virtual channel.

Further, when the world state is the intermediate state, the render camera tends to move between the first world and the second world through the virtual channel because the location of the render camera is close to the virtual channel. In other words, wall penetration may occur. Therefore, in this embodiment, to avoid wall penetration and ensure that the virtual channel has an extremely small thickness, a room generated for the virtual channel can accommodate the render camera.

Specifically, the room is constructed by the virtual channel and a wall, and a room area enclosed by the virtual channel and the wall is used for accommodating the render camera. The virtual channel is hollow, and the wall is made of a transparent material.

The following explains how to avoid wall penetration by using the room capable of accommodating the render camera.

As described above, wall penetration refers to that one part of the user's vision penetrates the wall and sees the other world in the virtual scene, while the other part of the user's vision does not penetrate the wall and still sees the current world in the virtual scene. It can be understood that when the user crosses between the two worlds, or in other words, when the render camera moves between the first world and the second world through the virtual channel, if the render camera is always accommodated in a room, for the render camera located in the room, the user's vision, from any angle, either directly sees the current world in the virtual scene through the hollow virtual channel, or sees the other world in the virtual scene through a wall made of a transparent material. The phenomenon that one part of the user's vision penetrates the wall while the other part of the user's vision does not penetrate the wall will not occur.

In short, the virtual channel with a certain thickness is replaced with the room capable of accommodating the render camera, thereby avoiding wall penetration and fully ensuring an extremely small thickness of the virtual channel.

In a possible implementation, the method further includes step 390: Display, in the virtual scene, the room capable of accommodating the render camera.

Specifically, after the virtual channel, the first world, and the second world are displayed based on the initial forms present when the virtual scene is constructed, as the render camera moves in the virtual scene, the room capable of accommodating the render camera is also displayed. Therefore, after the problem of wall penetration is resolved, regardless of how the render camera moves in the virtual scene, it can be ensured that the virtual channel always has an extremely small thickness.

Through the process described above, the two worlds with infinite space in the virtual scene can be implemented based on the room model. The room model enables the first world and the second world to be constructed by using the same coordinate system, which effectively reduces calculation workload during image rendering, thereby effectively improving image rendering performance.

In addition, the high image rendering performance releases the limitation from the hardware configured for the user equipment, which not only improves versatility and applicability of image rendering, but also improves picture fluency in the user equipment.

Figure 11:
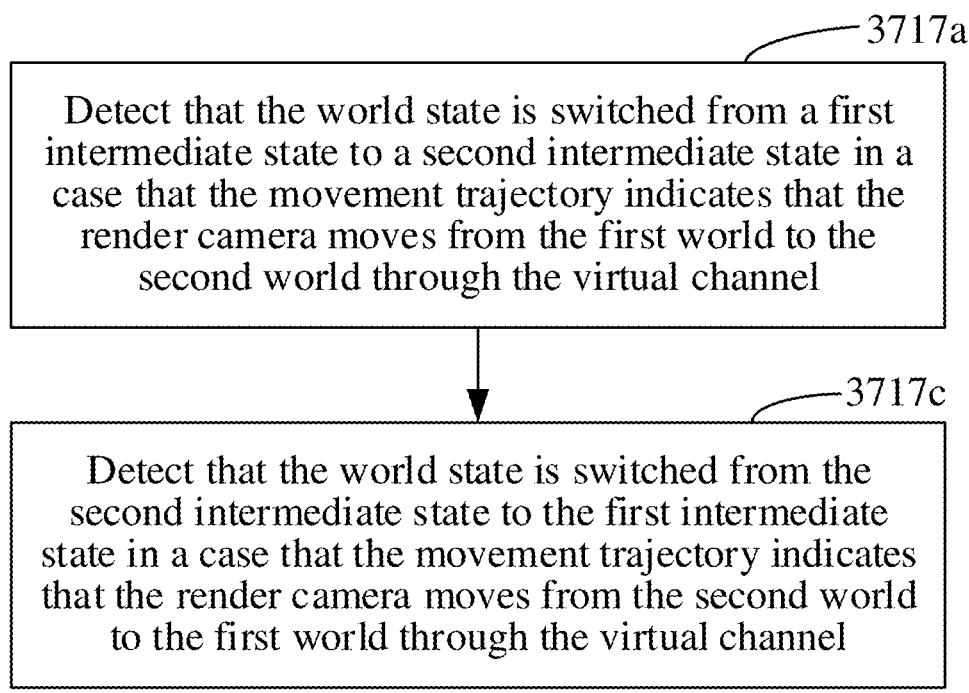
FIG. 11 is a flowchart of step 3717 in the embodiment corresponding to FIG. 10 according to an embodiment.

Referring to FIG. 11, in an exemplary embodiment, the intermediate state includes a first intermediate state and a second intermediate state.

As described above, the intermediate state means that the location of the render camera is close to the virtual channel. Therefore, with respect to a world that the location of the render camera is in, the intermediate state is further divided into the first intermediate state and the second intermediate state.

The first intermediate state means that the location of the render camera is close to the virtual channel and in the first world. In this case, the render camera tends to move from the first world to the second world through the virtual channel.

The second intermediate state means that the location of the render camera is close to the virtual channel and in the second world. In this case, the render camera tends to move from the second world to the first world through the virtual channel.

Accordingly, step 3717 may include the following steps:

Step 3717a: Detect that the world state is switched from the first intermediate state to the second intermediate state in a case that the movement trajectory indicates that the render camera moves from the first world to the second world through the virtual channel.

Specifically, when the render camera moves from the first world to the second world through the virtual channel, the location of the render camera is close to the virtual channel but has moved from the first world to the second world. Therefore, the world state is switched from the first intermediate state to the second intermediate state accordingly.

Step 3717c: Detect that the world state is switched from the second intermediate state to the first intermediate state in a case that the movement trajectory indicates that the render camera moves from the second world to the first world through the virtual channel.

Similarly, when the render camera moves from the second world to the first world through the virtual channel, the location of the render camera is close to the virtual channel but has moved from the second world to the first world. Therefore, the world state is switched from the second intermediate state to the first intermediate state accordingly.

In the foregoing process, of different world states are detected, which provides a sufficient basis for subsequently determining whether the rooms with different structure are generated for the virtual channel.

The following details a process of generating the rooms with different structures for different world states.

In an exemplary embodiment, the foregoing method may further include the following step:

still displaying the virtual channel in the virtual scene in a case that it is detected that the world state is the first world state.

Specifically, for the first world state, the virtual channel is still maintained in the initial form present when the virtual scene is constructed, and step 330 is performed.

Figure 12:
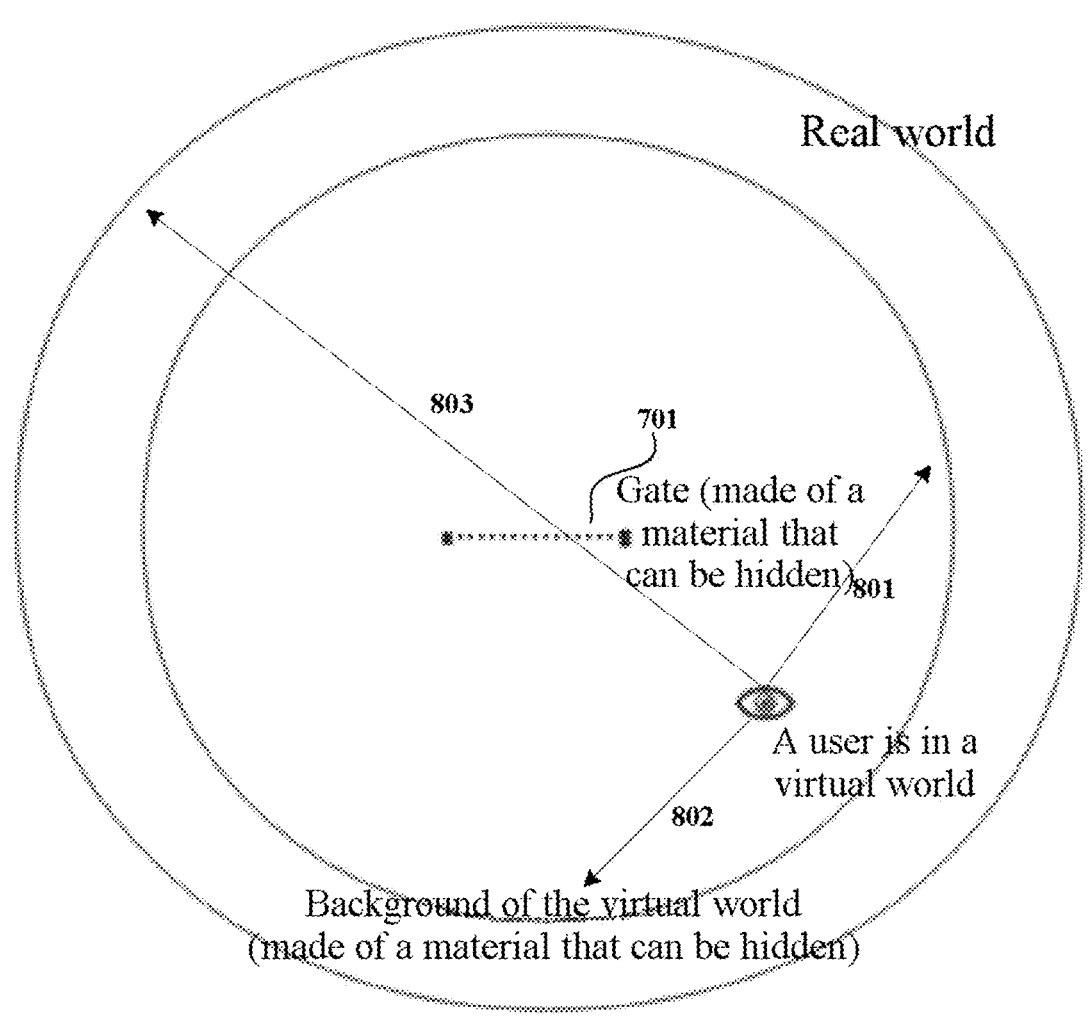
FIG. 12 is a schematic top view of a virtual scene in which a render camera is not close to a virtual channel and a world state is a first world state according to an exemplary embodiment.

The virtual channel in the initial form present when the virtual scene is constructed is generated by rendering first room model data. As shown in FIG. 12, a virtual channel 701 described in the first room model data is in the initial form present when the virtual scene is constructed, and has an extremely small thickness.

In the present disclosure, a virtual channel may be a gate or a virtual gate, which may be made of a transparent material. In another implementation, the virtual channel may be a gate or a virtual gate, which may be hollow.

Therefore, when the user is in the virtual scene, the user's vision sees the first world, for example, the virtual world, via light 801 and light 802, and sees the second world, for example, the real world, via light 803 through the virtual channel 701.

Referring to FIG. 13, in an exemplary embodiment, step 373 may include the following steps:

Step 3731: Obtain second room model data in a case that it is detected that the world state is the first intermediate state of the intermediate state.

Step 3733: Generate, through rendering according to the second room model data, a room with a wall convex in a movement direction indicated by the movement trajectory, a convex area enclosed by the wall and the virtual channel being used for accommodating the render camera.

For the first intermediate state, because the render camera tends to move from the first world to the second world through the virtual channel, the rooms with different structures need to be generated for the virtual channel while it is ensured that the virtual channel has an extremely small thickness, to avoid wall penetration.

Figure 14:
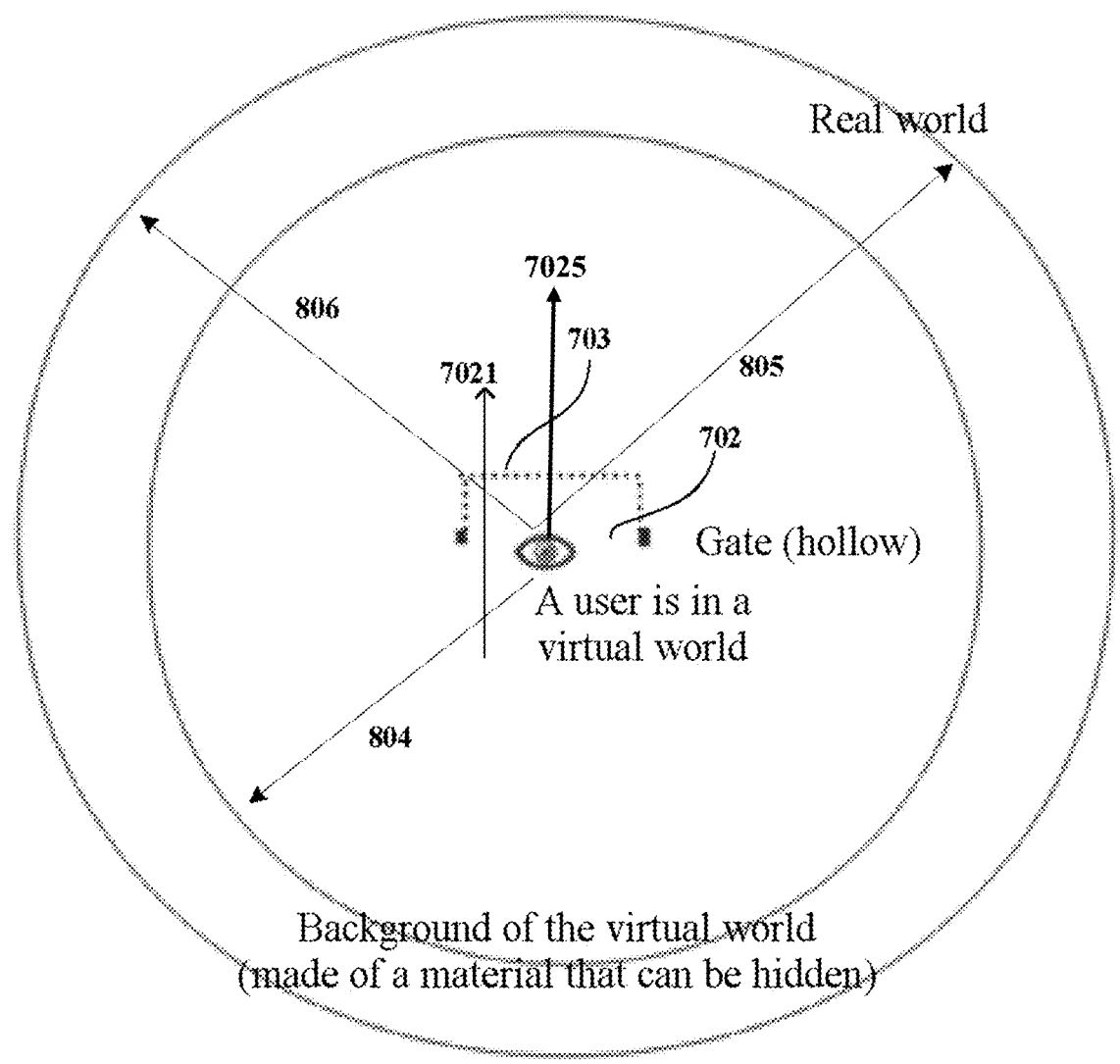
FIG. 14 is a schematic top view of a virtual scene in which a render camera is close to a virtual channel and a world state is a first world state according to an exemplary embodiment.

The room is generated based on the second room model data. As shown in FIG. 14, the room described in the second room model data is constructed by a virtual channel 702 and a wall 703. The virtual channel 702 is hollow, and the wall 703 is made of a single-layer transparent material and has a rectangular structure.

Certainly, according to an actual requirement of an application scenario, the wall 703 may have another structure in semicircular, triangle, or other shapes, as long as the wall 703 can be closed with the virtual channel 702, so that a convex area enclosed by the wall 703 and the virtual channel 702 accommodates the render camera, which is not limited in this embodiment. Herein, "convex" is described relative to a movement direction, that is, 7021, indicated by the movement trajectory. In one implementation, the wall 703 may be convex relative to the virtual channel 702 towards the movement direction 7021. In another implementation, a direction 7025 from a central portion of the virtual channel 702 to a central portion of the wall 703 may substantially align with the movement direction 7021.

Therefore, when the user is in the virtual scene, the user's vision sees the first world, for example, the virtual world, via light 804, and sees the second world, for example, the real world, via light 805 and light 806 through the virtual channel 702.

Figure 15:
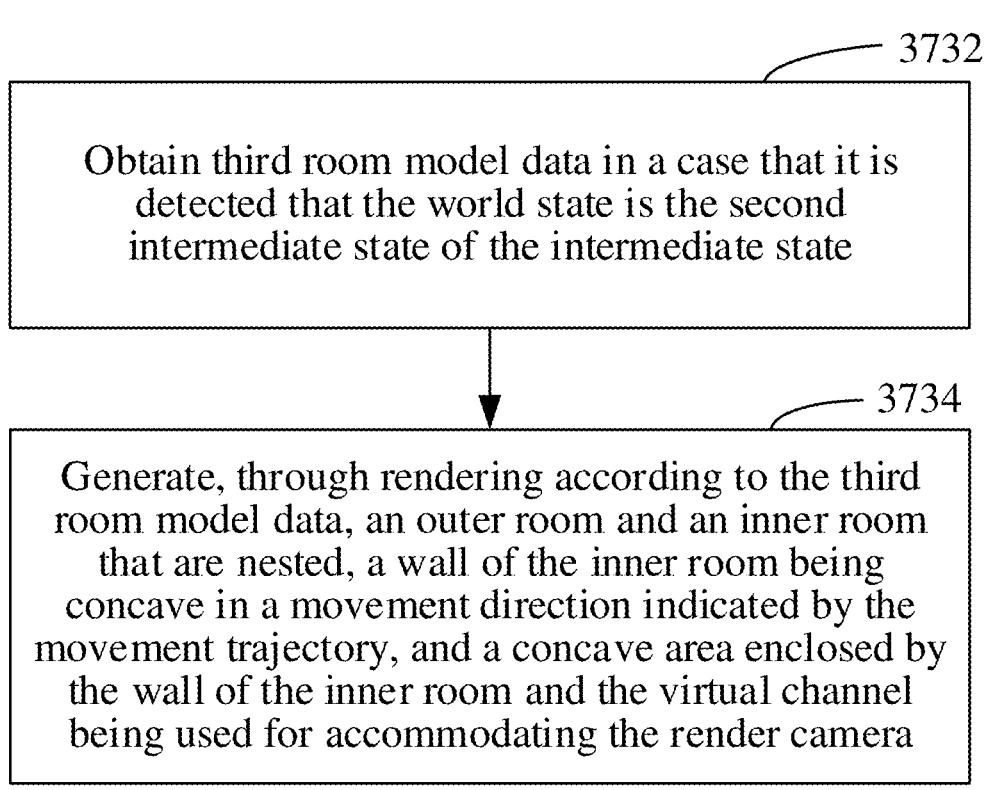
FIG. 15 is a flowchart of step 373 in the embodiment corresponding to FIG. 4 according to another embodiment.

Referring to FIG. 15, in another exemplary embodiment, step 373 may include the following steps:

Step 3732: Obtain third room model data in a case that it is detected that the world state is the second intermediate state of the intermediate state.

Step 3734: Generate, through rendering according to the third room model data, an outer room and an inner room that are nested, a wall of the inner room being concave in a movement direction indicated by the movement trajectory, and a concave area enclosed by the wall of the inner room and the virtual channel being used for accommodating the render camera.

For the second intermediate state, because the render camera tends to move from the second world to the first world through the virtual channel, the rooms with different structures need to be generated for the virtual channel while it is ensured that the virtual channel has an extremely small thickness, to avoid wall penetration.

Figure 16:
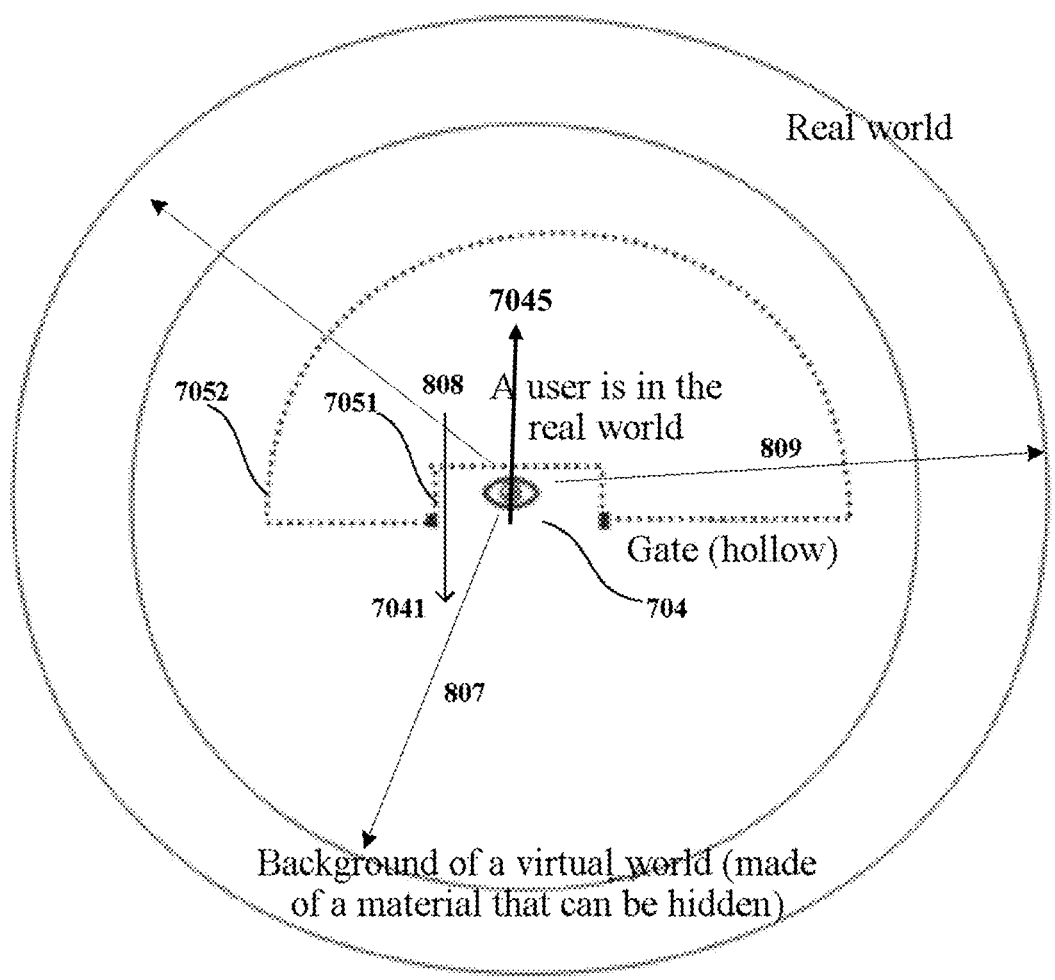
FIG. 16 is a schematic top view of a virtual scene in which a render camera is close to a virtual channel and a world state is a second world state according to an exemplary embodiment.

The rooms are generated based on the third room model data. As shown in FIG. 16, the rooms described in the third room model data include an outer room and an inner room that are nested. A virtual channel 704 is hollow, and there are two layers of walls, both of which are made of a transparent material.

Specifically, the inner room is constructed by the virtual channel 704 and a first layer of wall 7051, and the outer room is constructed by the virtual channel 704 and a second layer of wall 7052. The first layer of wall 7051 has a rectangular structure and the second layer of wall 7052 has a semicircular structure. Both are connected to the virtual channel 704.

Similarly, according to an actual requirement of an application scenario, each layer of wall may have another structure in triangular, trapezoid, or other shapes, as long as it can be closed with the virtual channel 704 so that a concave area enclosed by the first layer of wall 7051 and the virtual channel 704 accommodates the render camera, which is not limited in this embodiment. Herein, "concave" is described relative to a movement direction, that is, 7041, indicated by the movement trajectory. In one implementation, the first layer of wall 7051 may be concave relative to the virtual channel 704 corresponding to the movement direction 7021. In another implementation, a direction 7045 from a central portion of the virtual channel 704 to a central portion of the first layer of wall 7051 may substantially opposite to the movement direction 7041.

Therefore, when the user is in the virtual scene, the user's vision sees the second world, for example, the real world, via light 808 and light 809, and sees the first world, for example, the virtual world, via light 807 through the virtual channel 704.

Figure 17:
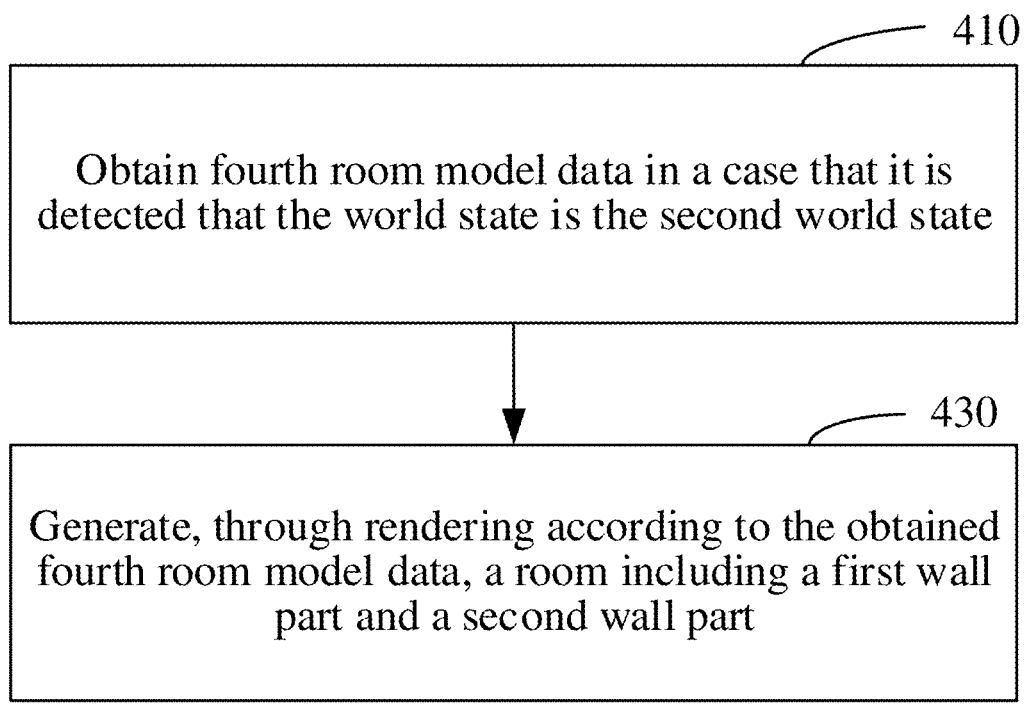
FIG. 17 is a flowchart of another method for rendering a virtual channel in a multi-world virtual scene according to an exemplary embodiment.

Referring to FIG. 17, in another exemplary embodiment, the foregoing method may further include the following steps:

Step 410: Obtain fourth room model data in a case that it is detected that the world state is the second world state.

Step 430: Generate, through rendering according to the obtained fourth room model data, a room including a first wall part and a second wall part.

The first wall part and the second wall part are located on two sides of a plane on which the virtual channel is located, and a room area enclosed by the second wall part and the plane on which the virtual channel is located is used for accommodating the render camera.

For the second world state, because the render camera has moved from the first world to the second world through the virtual channel, the rooms with different structures need to be generated for the virtual channel while it is ensured that the virtual channel has an extremely small thickness, to prevent an error from occurring in the world seen by the user.

Figure 18:
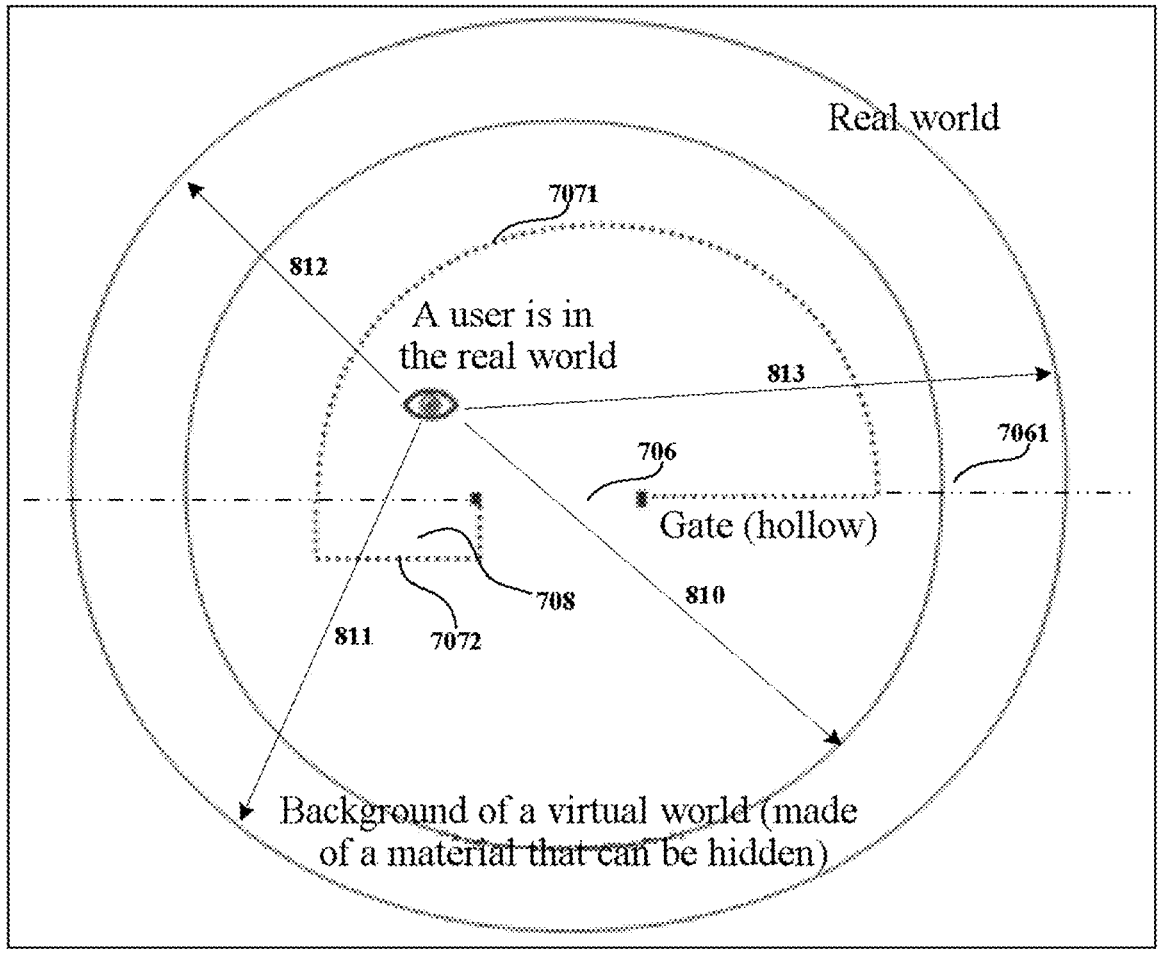
FIG. 18 is a schematic top view of a virtual scene in which a render camera is not close to a virtual channel and a world state is a second world state according to an exemplary embodiment.

The room is generated through rendering based on the fourth room model data. As shown in FIG. 18, a room described in the fourth room model data is constructed by a virtual channel 706 and a wall. The virtual channel 706 is hollow, and the wall is made of a single-layer transparent material.

Further, the wall includes a first wall part 7071 having a semicircular structure and a second wall part 7072, and the first wall part 7071 and the second wall part 7072 are located on two sides of a plane 7061 on which the virtual channel is located.

Similarly, according to an actual requirement of an application scenario, each wall part may have another structure in triangular, trapezoid, or other shapes, as long as the wall part can be closed with the virtual channel 706, so that a room area 708 enclosed by the first wall part 7072 and the plane 7061 on which the virtual channel is located accommodates the render camera, which is not limited in this embodiment.

Therefore, when the user is in the virtual scene, the user's vision sees the second world, for example, the real world, via light 811, light 812, and light 813, and sees the first world, for example, the virtual world, via light 810 through the virtual channel.

In the foregoing process, corresponding room model data is obtained for different world states, and the rooms with different structures are generated accordingly, which not only avoids wall penetration, but also implements a virtual channel with an extremely small thickness, thereby effectively avoiding a picture jump on the user equipment when the user crosses between the two worlds, and helping improve user experience.

Figure 19:
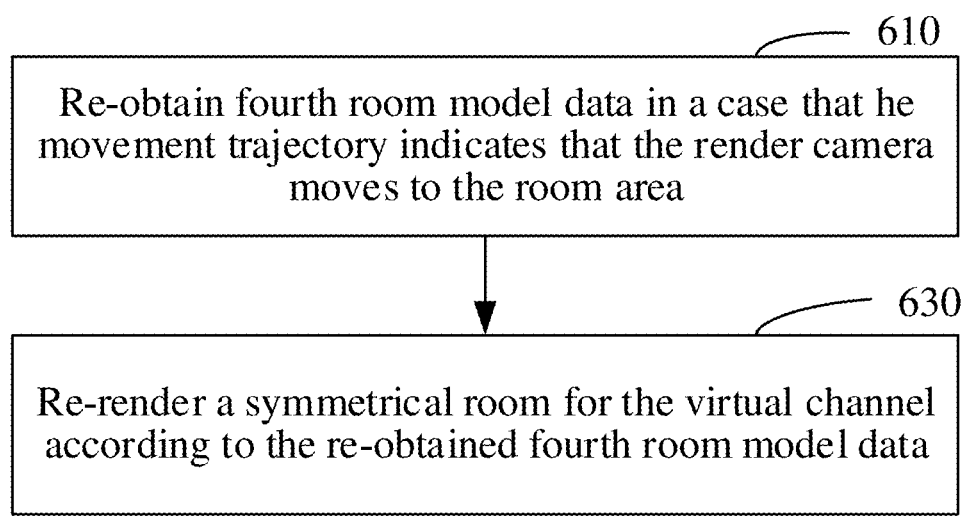
FIG. 19 is a flowchart of another method for rendering a virtual channel in a multi-world virtual scene according to an exemplary embodiment.

Referring to FIG. 19, in an exemplary embodiment, the foregoing method may further include the following steps:

Step 610: Re-obtain fourth room model data in a case that the movement trajectory indicates that the render camera moves to the room area.

Step 630: Re-render a symmetrical room for the virtual channel according to the re-obtained fourth room model data.

As shown in FIG. 18, if the render camera moves to the room area 708, it is considered that wall penetration occurs on the render camera. However, during the movement, no wall is provided for this room on the movement trajectory of the render camera. In other words, there is no wall with a certain thickness. Therefore, wall penetration is substantially avoided.

Understandably, after moving to the room area 708, the render camera may continue moving downward in a vertical direction shown in FIG. 18 and leave the room, or may go back the same way (moving upward in the vertical direction shown in FIG. 18) and return to the room. For the latter case, the room may remain unchanged because wall penetration is avoided. For the former case, wall penetration may occur due to the second wall part 7072 constituting the room area 708, which requires a corresponding change in the structure of the room.

Specifically, the movement trajectory of the render camera is detected first, to determine that the render camera moves to the room area of the room.

Then, based on the fact that the render camera moves to the room area of the room, the fourth room model data is re-obtained and the symmetrical room is re-rendered.

Although the fourth room model data is still obtained, because the re-rendering is aimed at the render camera that moves to the room area, the structure of the room will be changed, that is, being symmetrical to the original room.

Figure 20:
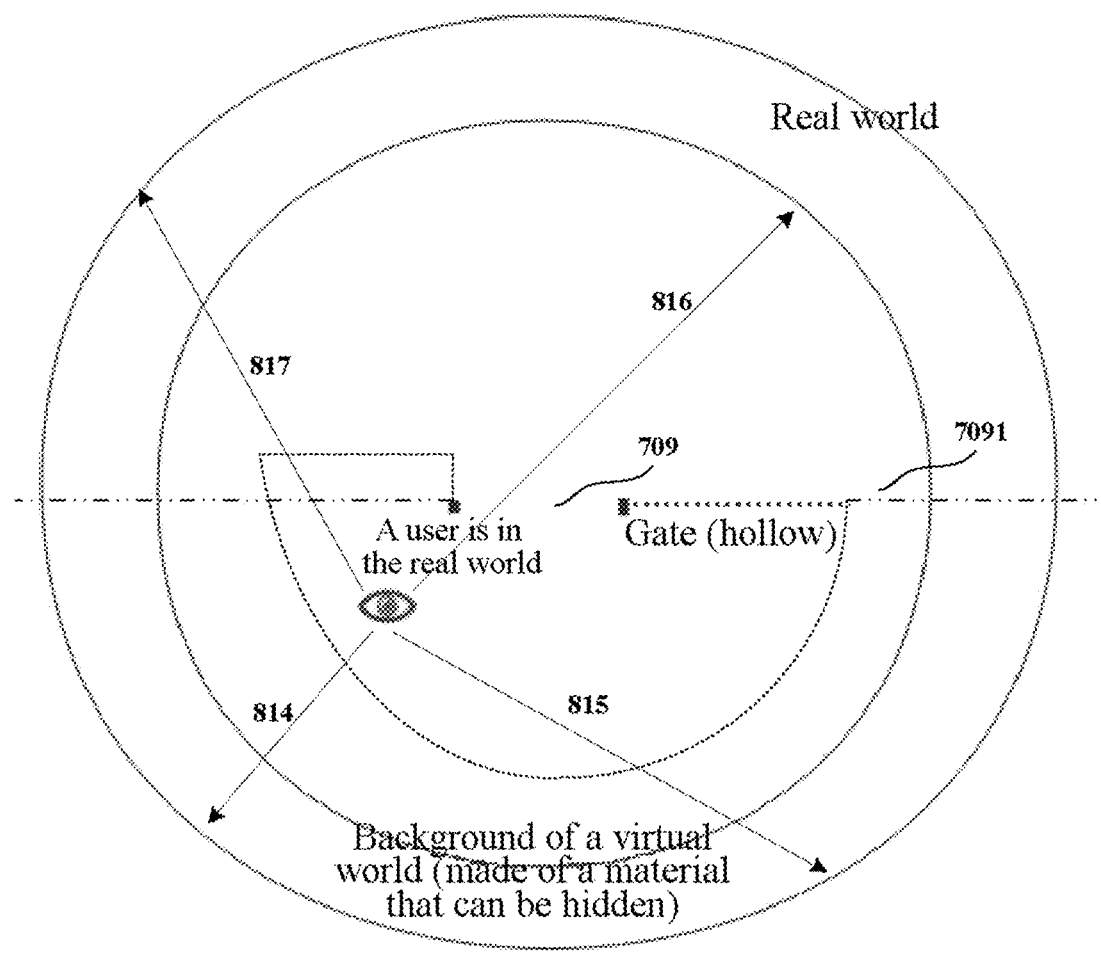
FIG. 20 is a schematic top view of a virtual scene after a render camera moves to a specified area of a room model according to an exemplary embodiment.

As shown in FIG. 20, the room generated after the re-rendering and the room in FIG. 18 are symmetrical with a plane 7091 on which the virtual channel is located as an axis of symmetry. Then, when the render camera moves downward in a vertical direction shown in FIG. 20, because no wall is provided for this room on the movement trajectory of the render camera, or in other words, there is no wall with a certain thickness, wall penetration is substantially avoided.

Therefore, when the user is in the virtual scene, the user's vision sees the second world, for example, the real world, via light 814, light 815, and light 817, and sees the first world, for example, the virtual world, via light 816 through the virtual channel.

The foregoing embodiments cooperate to fully ensure construction of two worlds with infinite space in a virtual scene based on a room model, thereby fully ensuring image rendering performance and picture fluency in user equipment.

In addition, both a virtual channel in an initial form present when a virtual scene is constructed and a hollow virtual channel may be considered as having extremely small thicknesses, which effectively avoids a world jump seen by a user during crossing between two worlds.

Figure 21:
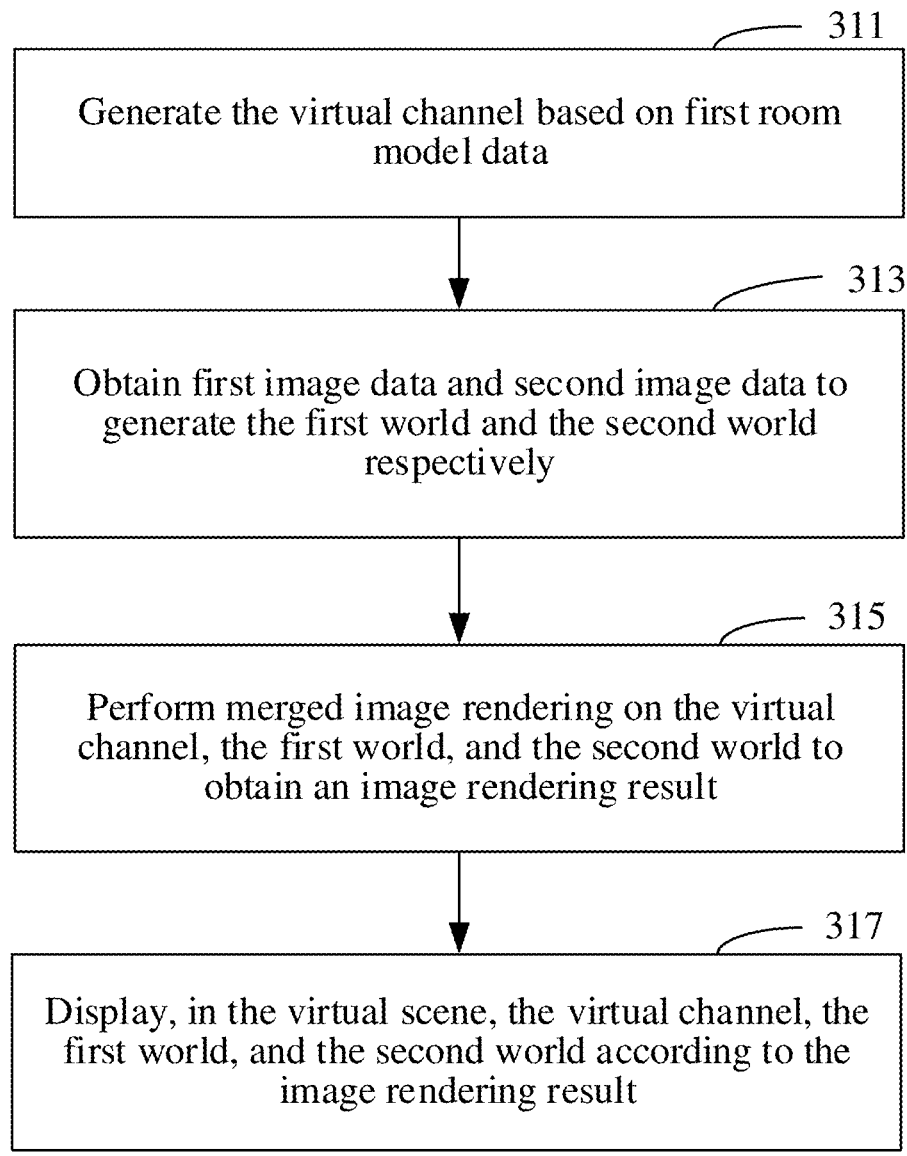
FIG. 21 is a flowchart of step 310 in the embodiment corresponding to FIG. 4 according to an embodiment.

Referring to FIG. 21, in an exemplary embodiment, step 310 may include the following steps:

Step 311: Generate the virtual channel based on the first room model data.

Step 313: Obtain first image data and second image data to generate the first world and the second world respectively.

Step 315: Perform merged image rendering on the virtual channel, the first world, and the second world to obtain an image rendering result.

Step 317: Display, in the virtual scene, the virtual channel, the first world, and the second world according to the image rendering result.

It is to be understood that regardless of whether the render camera rotates by 360 degrees with itself as a center point or moves in the virtual scene, the virtual channel, the first world, and the second world in the virtual scene that are seen by the user's vision will change accordingly. Then, during the merged image rendering, the image rendering result will change accordingly, and a different virtual channel, first world, and second world will be displayed in the virtual scene.

Although the structure of the room changes with the location of the render camera during movement in the virtual scene, because the wall provided for the room is made of the transparent material and the virtual channel is hollow, for the user's vision, the virtual channel remains relatively unchanged during the rotation or the movement of the render camera, that is, the virtual channel made of the transparent material is always seen and has an extremely small thickness.

Through the foregoing process, a product form supporting multi-layer world crossing (involving the first world, the second world, and the room) is implemented. The first world and the second world are constructed in the same coordinate system via the room, thereby reducing calculation workload during image rendering and improving image rendering performance. In addition, the structure of the room changes with the location of the render camera during movement in the virtual scene, thereby well resolving the problem of wall penetration, enabling the virtual channel to always have an extremely small thickness, effectively resolving the problem of a world jump seen by the user during crossing between the two worlds, and enhancing user experience.

The following describes apparatus embodiments of this application, which may be used for performing the method for rendering a virtual channel in a multi-world virtual scene in this application. For details not disclosed in the apparatus embodiments of this application, refer to the method embodiments of the method for rendering a virtual channel in a multi-world virtual scene in this application.

Figure 22:
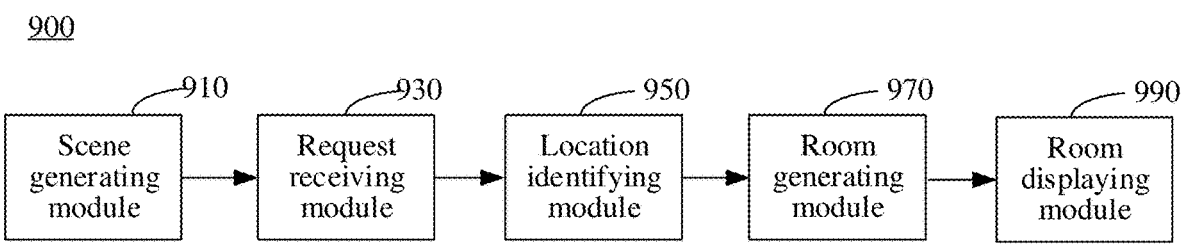
FIG. 22 is a block diagram of an apparatus for rendering a virtual channel in a multi-world virtual scene according to an exemplary embodiment.

Referring to FIG. 22, in an exemplary embodiment, an apparatus 900 for rendering a virtual channel in a multi-world virtual scene includes, but is not limited to, a scene generating module 910, a request receiving module 930, a location identifying module 950, and a room generating module 970.

The scene generating module 910 is configured to generate a virtual scene for displaying a virtual channel, a first world, and a second world, the virtual channel being used for a render camera to move between the first world and the second world.

The request receiving module 930 is configured to receive a control request for triggering the render camera to move in the virtual scene.

The location identifying module 950 is configured to identify a location of the render camera in response to the control request to obtain a movement trajectory of the render camera during movement in the virtual scene.

The room generating module 970 is configured to detect a world state according to the movement trajectory, and generate a room capable of accommodating the render camera for the virtual channel in a case that it is detected that the world state is an intermediate cross state.

In a possible implementation, the apparatus further includes a room displaying module 990, configured to display, in the virtual scene, the room capable of accommodating the render camera.

When the apparatus for rendering a virtual channel in a multi-world virtual scene provided in the foregoing embodiment renders a virtual channel in a multi-world virtual scene, only division of the foregoing function modules is used as an example for description. In actual application, the foregoing functions may be allocated to and completed by different function modules as required, that is, an internal structure of the apparatus for rendering a virtual channel in a multi-world virtual scene is divided into different function modules to complete all or some of the functions described above.

In addition, the apparatus for rendering a virtual channel in a multi-world virtual scene provided in the foregoing embodiment belongs to the same idea as the method for rendering a virtual channel in a multi-world virtual scene provided in the foregoing embodiments. A specific manner in which each module operates has been detailed in the method embodiments, and details are not described herein again.

Figure 23:
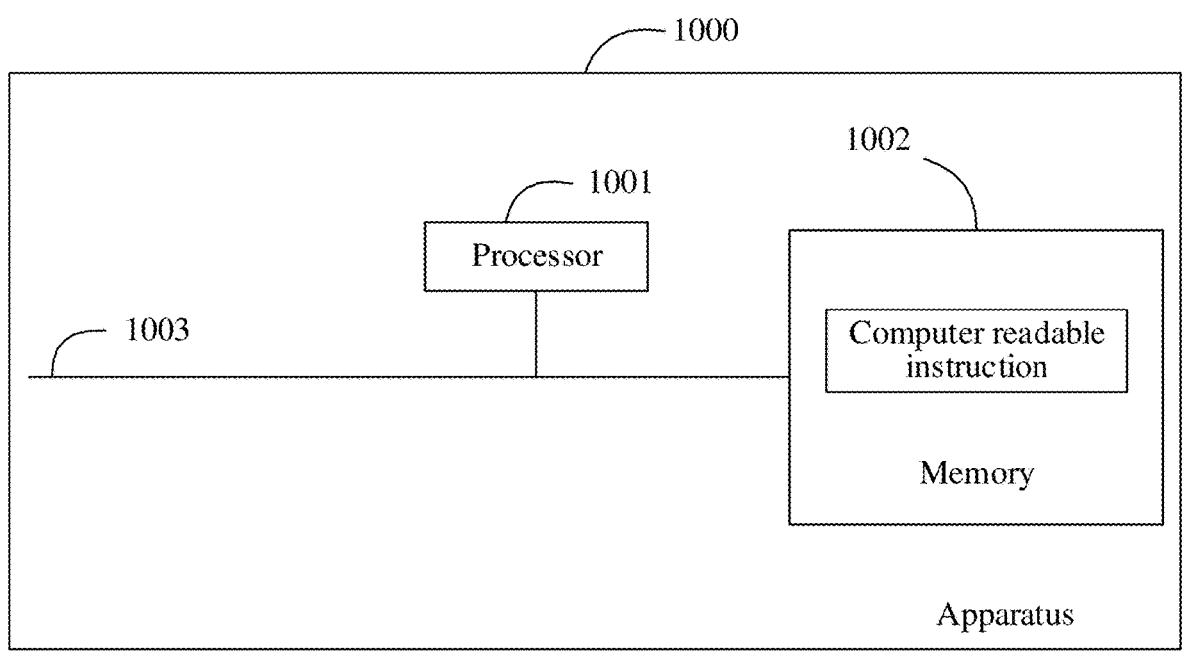
FIG. 23 is a block diagram of a hardware structure of an apparatus for rendering a virtual channel in a multi-world virtual scene according to an exemplary embodiment.

Referring to FIG. 23, in an exemplary embodiment, an apparatus 1000 for rendering a virtual channel in a multi-world virtual scene includes a processor 1001 and a memory 1002.

The processor 1001 may be a central processing unit (CPU), an application-specific integrated circuit (ASIC), or one or more integrated circuits configured to implement the embodiments of this application.

The memory 1002 may include a high-speed RAM, and may also include a non-volatile memory, such as at least one disk memory.

The memory 1002 stores a computer readable instruction. The computer readable instruction, when executed by the processor 1001, implements the method for rendering a virtual channel in a multi-world virtual scene provided in the foregoing embodiments.

In an exemplary embodiment, a computer readable storage medium is provided. The computer readable storage medium stores a computer program. The computer program, when executed by a processor, implements the method for rendering a virtual channel in a multi-world virtual scene provided in the foregoing embodiments.

An embodiment of this application further provides a computer program product including an instruction. The computer program product, when run on a server, causes the server to perform the method for rendering a virtual channel in a multi-world virtual scene provided in the foregoing embodiments.

The embodiments in the specification are all described in a progressive manner. For same or similar parts in the embodiments, refer to these embodiments, and each embodiment focuses on a difference from other embodiments. The apparatus embodiments are substantially similar to the method embodiments and therefore are only briefly described, and reference may be made to the method embodiments for the related part.

A person skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions.

Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

In combination with the embodiments disclosed herein, steps of the method or algorithm described may be directly implemented using hardware, a software module executed by a processor, or the combination thereof. The software module may be placed in a RAM, a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the art.

The foregoing description of the disclosed embodiments enables a person skilled in the art to implement or use this application. Various modifications to the embodiments are obvious to the person skilled in the art, and general principles defined in this specification may be implemented in other embodiments without departing from the spirit or scope of this application. Therefore, this application will not be limited to the embodiments described in this specification but extends to the widest scope that complies with the principles and novelty disclosed in this specification.

What is claimed is:

1. A method for rendering a virtual channel in a multi-world virtual scene, comprising:
   generating, by a device comprising a memory storing instructions and a processor in communication with the memory, a virtual scene for displaying a virtual channel, a first world, and a second world, the virtual channel being used for a render camera to move between the first world and the second world;
   receiving, by the device, a control request for triggering the render camera to move in the virtual scene;
   identifying, by the device, a location of the render camera in response to the control request to obtain a movement trajectory of the render camera during movement in the virtual scene;
   detecting, by the device, a world state according to the movement trajectory by:
      determining, by the device, the location of the render camera and a distance between the location and the virtual channel according to the movement trajectory,
      in response to the distance exceeding a specified range and the location being in the first world, detecting, by the device, that the world state is a first world state,
      in response to the distance exceeding the specified range and the location being in the second world, detecting, by the device, that the world state is a second world state, and
      in response to the distance not exceeding the specified range, detecting, by the device, that the world state is an intermediate state;
   in response to determining the world state is the intermediate state, generating, by the device, a room for accommodating the render camera; and
   displaying in the virtual scene, by the device, the room for accommodating the render camera.

2. The method according to claim 1, wherein the receiving, by the device, the control request for triggering the render camera to move in the virtual scene comprises:
   detecting, by the device, a moving state of a mobile terminal; and
   generating, by the device, the control request according to the moving state of the mobile terminal, to trigger the render camera to move in the virtual scene according to the moving state of the mobile terminal.

3. The method according to claim 1, wherein the generating, by the device, the virtual scene for displaying the virtual channel, the first world, and the second world comprises:
   generating, by the device, the virtual channel according to first room model data;
   generating, by the device, the first world and the second world respectively according to obtained first image data and second image data;
   performing, by the device, merged image rendering on the virtual channel, the first world, and the second world to obtain an image rendering result; and
   displaying in the virtual scene, by the device, the virtual channel, the first world, and the second world according to the image rendering result.

4. The method according to claim 1, wherein:
   the intermediate state comprises a first intermediate state and a second intermediate state; and
   the detecting, by the device, that the world state is the intermediate state comprises:
      in response to the movement trajectory indicating that the render camera moves from the first world to the second world through the virtual channel, detecting that the world state is switched from the first intermediate state to the second intermediate state, and
      in response to the movement trajectory indicating that the render camera moves from the second world to the first world through the virtual channel, detecting that the world state is switched from the second intermediate state to the first intermediate state.

5. The method according to claim 4, wherein in response to determining the world state is the intermediate state, the generating, by the device, the room for accommodating the render camera comprises:
   in response to detecting that the world state is the first intermediate state of the intermediate state:
      obtaining, by the device, second room model data, and
      generating, by the device through rendering according to the second room model data, the room with a wall convex in a movement direction indicated by the movement trajectory, a convex area enclosed by the wall and the virtual channel being used for accommodating the render camera; and
   in response to detecting that the world state is the second intermediate state of the intermediate state:
      obtaining, by the device, third room model data, and
      generating, by the device through rendering according to the third room model data, an outer room and an inner room that are nested, a wall of the inner room being concave in a movement direction indicated by the movement trajectory, and a concave area enclosed by the wall of the inner room and the virtual channel being used for accommodating the render camera.

6. The method according to claim 1, wherein the receiving, by the device, the control request for triggering the render camera to move in the virtual scene comprises:
   generating, by the device, the control request according to a moving operation, to trigger the render camera to move in the virtual scene according to the moving operation.

7. An apparatus for rendering a virtual channel in a multi-world virtual scene, comprising:
a memory storing instructions; and
a processor in communication with the memory, wherein, when the processor executes the instructions, the processor is configured to cause the apparatus to:
generate a virtual scene for displaying a virtual channel, a first world, and a second world, the virtual channel being used for a render camera to move between the first world and the second world,
receive a control request for triggering the render camera to move in the virtual scene,
identify a location of the render camera in response to the control request to obtain a movement trajectory of the render camera during movement in the virtual scene,
detect a world state according to the movement trajectory by:
determining the location of the render camera and a distance between the location and the virtual channel according to the movement trajectory,
in response to the distance exceeding a specified range and the location being in the first world, detecting that the world state is a first world state,
in response to the distance exceeding the specified range and the location being in the second world, detecting that the world state is a second world state, and
in response to the distance not exceeding the specified range, detecting, by the device, that the world state is an intermediate state,
in response to determining the world state is the intermediate state, generate a room for accommodating the render camera, and
display in the virtual scene the room for accommodating the render camera.

8. The apparatus according to claim 7, wherein, when the processor is configured to cause the apparatus to receive the control request for triggering the render camera to move in the virtual scene, the processor is configured to cause the apparatus to:
detect a moving state of a mobile terminal; and
generate the control request according to the moving state of the mobile terminal, to trigger the render camera to move in the virtual scene according to the moving state of the mobile terminal.

9. The apparatus according to claim 7, wherein, when the processor is configured to cause the apparatus to generate the virtual scene for displaying the virtual channel, the first world, and the second world, the processor is configured to cause the apparatus to:
generate the virtual channel according to first room model data;
generate the first world and the second world respectively according to obtained first image data and second image data;
perform merged image rendering on the virtual channel, the first world, and the second world to obtain an image rendering result; and
display in the virtual scene the virtual channel, the first world, and the second world according to the image rendering result.

10. The apparatus according to claim 7, wherein:
the intermediate state comprises a first intermediate state and a second intermediate state; and when the processor is configured to cause the apparatus to detect that the world state is the intermediate state, the processor is configured to cause the apparatus to:
in response to the movement trajectory indicating that the render camera moves from the first world to the second world through the virtual channel, detect that the world state is switched from the first intermediate state to the second intermediate state, and
in response to the movement trajectory indicating that the render camera moves from the second world to the first world through the virtual channel, detect that the world state is switched from the second intermediate state to the first intermediate state.

11. The apparatus according to claim 10, wherein, when the processor is configured to cause the apparatus to, in response to determining the world state is the intermediate state, generate the room for accommodating the render camera, the processor is configured to cause the apparatus to:
in response to detecting that the world state is the first intermediate state of the intermediate state:
obtain second room model data, and
generate, through rendering according to the second room model data, the room with a wall convex in a movement direction indicated by the movement trajectory, a convex area enclosed by the wall and the virtual channel being used for accommodating the render camera; and
in response to detecting that the world state is the second intermediate state of the intermediate state:
obtain third room model data, and
generate, through rendering according to the third room model data, an outer room and an inner room that are nested, a wall of the inner room being concave in a movement direction indicated by the movement trajectory, and a concave area enclosed by the wall of the inner room and the virtual channel being used for accommodating the render camera.

12. The apparatus according to claim 7, wherein, when the processor is configured to cause the apparatus to receive the control request for triggering the render camera to move in the virtual scene, the processor is configured to cause the apparatus to:
generate the control request according to a moving operation, to trigger the render camera to move in the virtual scene according to the moving operation.

13. A non-transitory computer readable storage medium storing computer readable instructions, wherein, the computer readable instructions, when executed by a processor, are configured to cause the processor to perform:
generating a virtual scene for displaying a virtual channel, a first world, and a second world, the virtual channel being used for a render camera to move between the first world and the second world;
receiving a control request for triggering the render camera to move in the virtual scene;
identifying a location of the render camera in response to the control request to obtain a movement trajectory of the render camera during movement in the virtual scene;
detecting a world state according to the movement trajectory by:
determining the location of the render camera and a distance between the location and the virtual channel according to the movement trajectory, in response to the distance exceeding a specified range and the location being in the first world, detecting, by the device, that the world state is a first world state, in response to the distance exceeding the specified range and the location being in the second world, detecting, by the device, that the world state is a second world state, and in response to the distance not exceeding the specified range, detecting, by the device, that the world state is an intermediate state;

in response to determining the world state is the intermediate state, generating a room for accommodating the render camera; and displaying in the virtual scene the room for accommodating the render camera.

14. The non-transitory computer readable storage medium according to claim 13, wherein, when the computer readable instructions are configured to cause the processor to perform receiving the control request for triggering the render camera to move in the virtual scene, the computer readable instructions are configured to cause the processor to perform:

detecting a moving state of a mobile terminal; and generating the control request according to the moving state of the mobile terminal, to trigger the render camera to move in the virtual scene according to the moving state of the mobile terminal.

15. The non-transitory computer readable storage medium according to claim 13, wherein, when the computer readable instructions are configured to cause the processor to perform generating the virtual scene for displaying the virtual channel, the first world, and the second world, the computer readable instructions are configured to cause the processor to perform:

generating the virtual channel according to first room model data;

generating the first world and the second world respectively according to obtained first image data and second image data;

performing merged image rendering on the virtual channel, the first world, and the second world to obtain an image rendering result; and displaying in the virtual scene the virtual channel, the first world, and the second world according to the image rendering result.

16. The non-transitory computer readable storage medium according to claim 13, wherein:

the intermediate state comprises a first intermediate state and a second intermediate state; and when the computer readable instructions are configured to cause the processor to perform detecting that the world state is the intermediate state, the computer readable instructions are configured to cause the processor to perform:

in response to the movement trajectory indicating that the render camera moves from the first world to the second world through the virtual channel, detecting that the world state is switched from the first intermediate state to the second intermediate state, and in response to the movement trajectory indicating that the render camera moves from the second world to the first world through the virtual channel, detecting that the world state is switched from the second intermediate state to the first intermediate state.

17. The non-transitory computer readable storage medium according to claim 16, wherein, when the computer readable instructions are configured to cause the processor to perform, in response to determining the world state is the intermediate state, generating the room for accommodating the render camera, the computer readable instructions are configured to cause the processor to perform:

in response to detecting that the world state is the first intermediate state of the intermediate state:

obtaining second room model data, and generating, through rendering according to the second room model data, the room with a wall convex in a movement direction indicated by the movement trajectory, a convex area enclosed by the wall and the virtual channel being used for accommodating the render camera; and in response to detecting that the world state is the second intermediate state of the intermediate state:

obtaining third room model data, and generating, through rendering according to the third room model data, an outer room and an inner room that are nested, a wall of the inner room being concave in a movement direction indicated by the movement trajectory, and a concave area enclosed by the wall of the inner room and the virtual channel being used for accommodating the render camera.

* * * * *